United States Patent
Asmi et al.

(10) Patent No.: US 11,257,057 B1
(45) Date of Patent: Feb. 22, 2022

(54) SECURE DUAL-MONITOR POINT-OF-SALE SYSTEM

(71) Applicant: Amazon Technologies, Inc., Seattle, WA (US)

(72) Inventors: Yasser Baseer Asmi, Redmond, WA (US); Robert Whittemore Dreyfoos, Kirkland, WA (US); Nicolas Guillaume Hostein, Seattle, WA (US); Smita Joshi, Issaquah, WA (US); Ismael Medrano, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 15/630,474

(22) Filed: Jun. 22, 2017

(51) Int. Cl.
*G06Q 20/20* (2012.01)

(52) U.S. Cl.
CPC ......... *G06Q 20/204* (2013.01); *G06Q 20/208* (2013.01)

(58) Field of Classification Search
CPC .......................... G06Q 20/204; G06Q 20/208
USPC ........................................................... 705/17
See application file for complete search history.

(56) References Cited

U.S. PATENT DOCUMENTS

| | | | |
|---|---|---|---|
| 5,978,772 A | 11/1999 | Mold | |
| 7,225,980 B2 * | 6/2007 | Ku | G06K 7/0008 235/383 |
| 7,296,755 B2 | 11/2007 | Nakajima | |
| 7,949,568 B2 * | 5/2011 | Fano | G06K 9/00 356/4.03 |
| 8,009,864 B2 * | 8/2011 | Linaker | G06K 9/00664 235/385 |
| 8,175,925 B1 * | 5/2012 | Rouaix | G06Q 20/203 705/22 |
| 8,189,855 B2 * | 5/2012 | Opalach | G06Q 10/087 382/100 |
| 8,423,431 B1 | 4/2013 | Rouaix et al. | |
| 8,630,924 B2 | 1/2014 | Groenevelt et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Garcia Ade
(74) *Attorney, Agent, or Firm* — Athorus, PLLC

(57) ABSTRACT

Point-of-sale systems may include stations having interactive monitors mounted at specific heights and angles that permit such monitors to be viewed and interacted with by an associate or a customer. Some point-of-sale systems may include two stations, each having a monitor aligned in opposite directions, a user of one monitor may not view the other monitor, and vice versa. The point-of-sale systems may also include instrument readers (e.g., credit card readers or NFC readers) for recognizing payment instruments of customers and identifying the customers based on the payment instruments. Each of the monitors and instrument readers may be linked by cables to computer devices that are securely housed in a chamber above which the monitors are mounted. The monitors and other components are installed in a modular fashion, and may be independently installed or replaced without requiring an installation or replacement of the entire point-of-sale system.

14 Claims, 17 Drawing Sheets

(56) References Cited

U.S. PATENT DOCUMENTS

| | | |
|---|---|---|
| 8,688,598 B1 | 4/2014 | Shakes et al. |
| 9,473,747 B2 | 10/2016 | Kobres et al. |
| 2002/0035512 A1 | 3/2002 | Pavlik |
| 2003/0002712 A1 | 1/2003 | Steenburgh et al. |
| 2004/0181467 A1 | 9/2004 | Raiyani et al. |
| 2006/0038009 A1 | 2/2006 | Russell et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2015/0019391 A1 | 1/2015 | Kumar et al. |
| 2015/0073907 A1 | 3/2015 | Purves et al. |

OTHER PUBLICATIONS

Cristian Pop, "Introduction to the BodyCom Technology", Microchip AN1391, May 2, 2011, pp. 1-26, vol. AN1391, No. DS01391A, Publisher 2011 Microchip Technology Inc.

\* cited by examiner

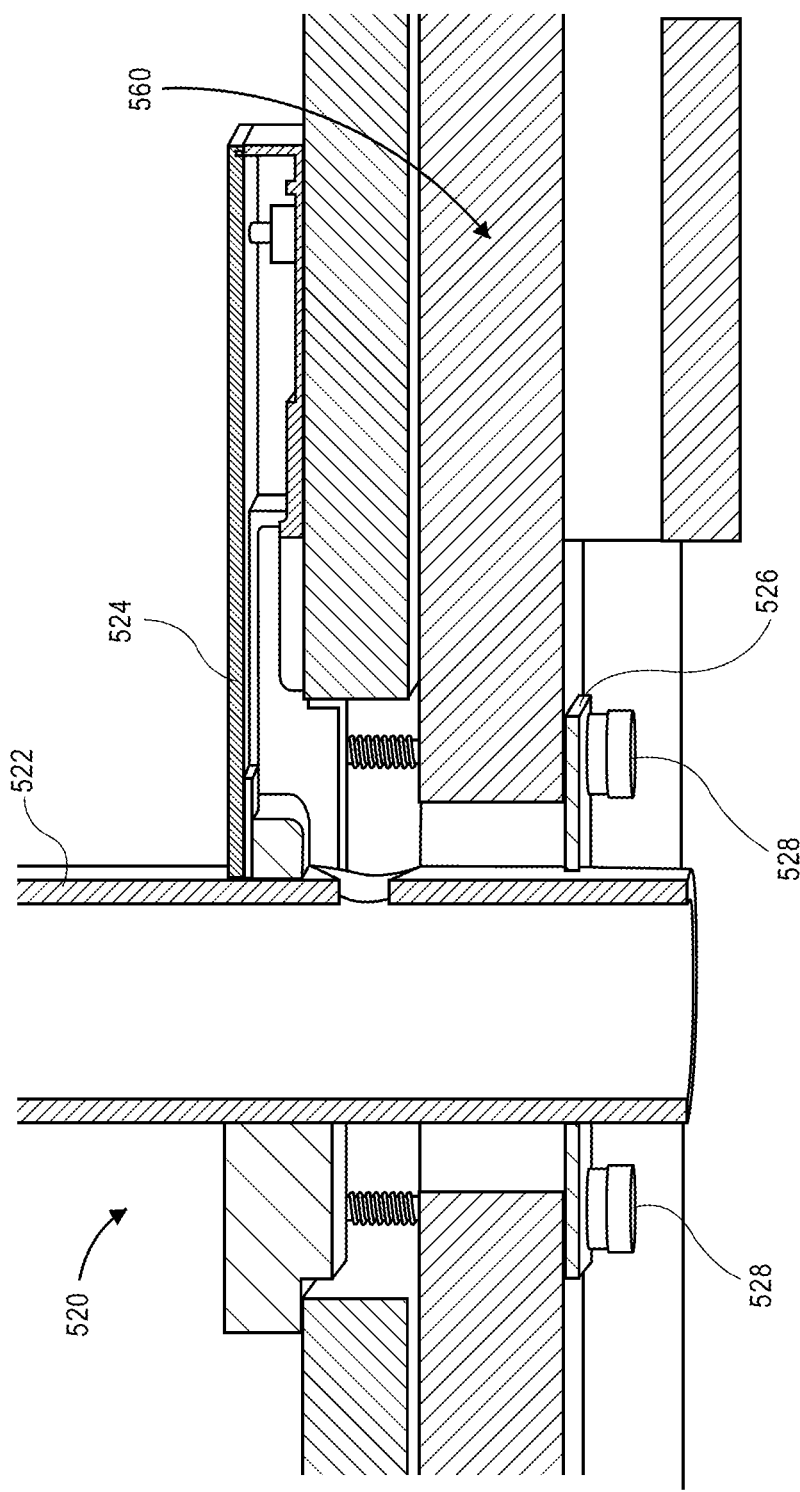

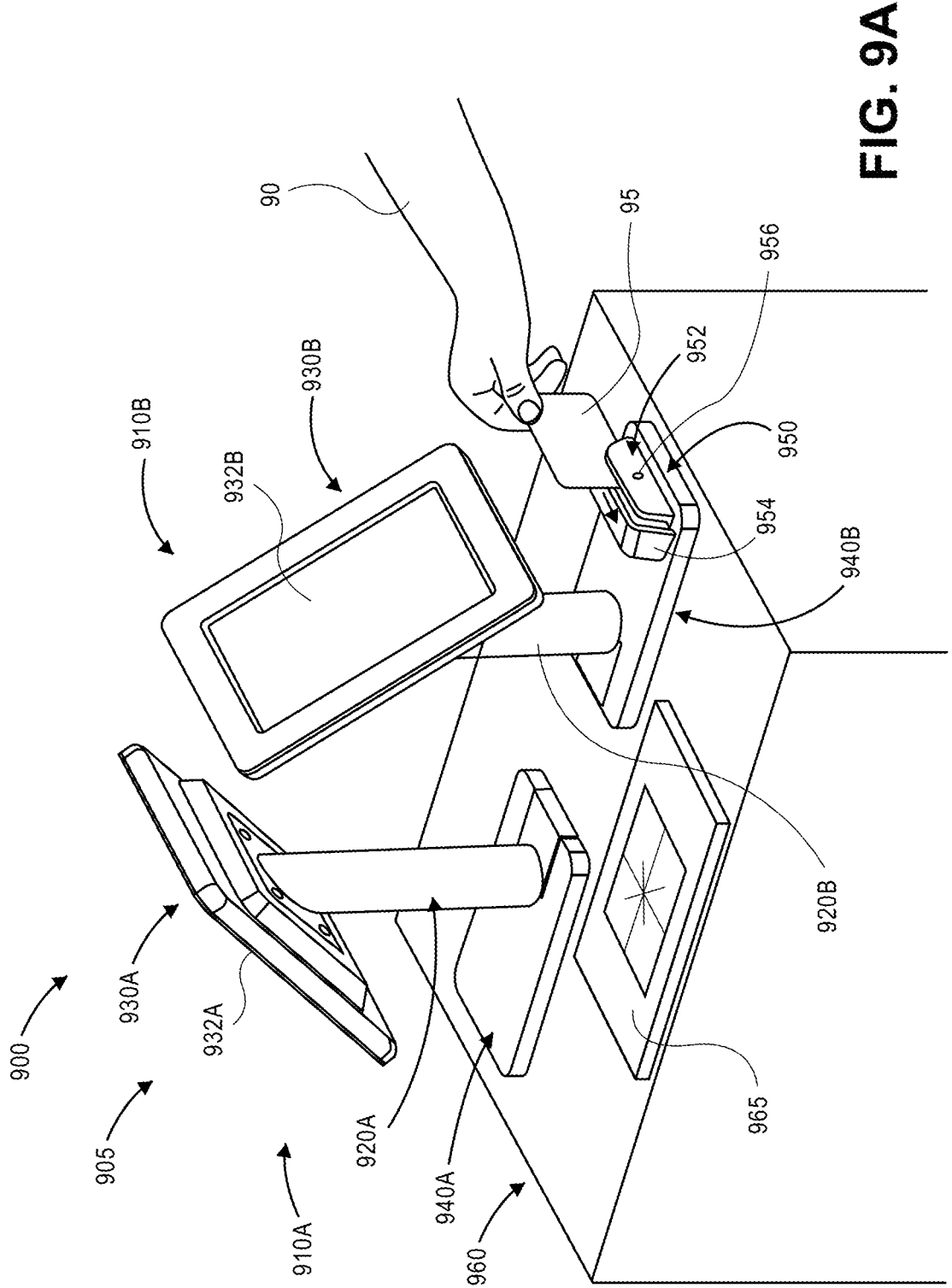

FIG. 9B

CUSTOMIZED INTERFACES IF CUSTOMER RECOGNIZED

932A

Customer: Nicholas  3:28 pm
Celebrating a birthday today!  February 4
Nicholas likes puppy dogs  24°F
and ice cream

11. BANANAS, BUNCH  $0.77
    0.78 LB @ $0.99/LB
    SKU 77741999

12. ICE CREAM, VANILLA  $4.99
    HALF GALLON
    SKU 82732004

13. CHERRIES, MARASCHINO  $3.50
    JAR (6 OZ)
    SKU 53412011

Nicholas prefers paper to plastic.
Nicholas previously purchased ice
cream cones on January 27.

[COMPLETE]  [VOID]

932B

Welcome  3:28 pm
Nicholas  February 4
   24°F

HAPPY BIRTHDAY
10% off toys today

Need more napkins? [OK]

8. Fudge  $4.45
9. Whipped Cream  $2.99
10. Walnuts  $3.75
11. Bananas  $0.77
12. Ice Cream  $4.99
13. Cherries  $3.50

TOTAL  $38.11

[AUTHORIZE]  [VOID]

FIG. 9C

SECURE DUAL-MONITOR POINT-OF-SALE SYSTEM

BACKGROUND

At bricks-and-mortar retail establishments, in-person transactions are typically completed at a "cash wrap," which is sometimes called a "cash well" or a "checkout counter." A customer who is interested in purchasing, renting, or executing any other type of transaction associated with a good or a service approaches a cash wrap from one side, and provides payment for the good or the service to an associate who is stationed on another side of the cash wrap. Traditionally, customers make payments at cash wraps by providing an associate with a sufficient sum of cash, by writing a personal check or money order and furnishing the check or money order to the associate. Alternatively, customers may make payments by presenting a payment instrument such as a credit card or debit card to an associate, who may then swipe the payment instrument in a magnetic reader, imprint embossed numbers on the payment instrument onto a receipt, such as by a credit card imprinter or "knuckle-buster," or manually record the numbers onto an invoice with a pen.

More recently, processes by which transactions are executed at cash wraps or other locations have been enhanced by advancements in technology. For example, in some locations, a customer may swipe his or her payment instrument at a reader that is in communication with a point-of-sale computer system and is accessible to the customer, not to the associate, or insert the payment instrument into such a reader. Additionally, some transactions may now be completed by presenting a device that is programmed with information regarding payment instruments to within an acceptable range of a near field communications-enabled (or "NFC") reader that is in communication with a point-of-sale computer system, or to another wireless reader, transmitting an authorization to execute a transaction from the device to the reader, and completing the transaction wirelessly. Such readers are typically small components that are not equipped to present substantial information regarding the transactions to customers, and are merely provided to accept information from payment instruments and confirm that a transaction has been authorized using such payment instruments.

Additionally, some cash wraps now feature point-of-sale systems operating on tablet computers that are joined to movable stands that may swivel and tilt to display a touchscreen to the associate and then to the customer, in order to enable each of the associate and the customer to execute interactions (e.g., taps, touches, gestures or other contact with a touchscreen) in order to complete a transaction thereby. However, such point-of-sale systems may be targets for theft or fraud, as the tablet computers have data regarding customers, retailers, transactions and items stored thereon, and this data may be subject to a risk of loss if the tablet computers are forcibly removed from such stands. Moreover, because such point-of-sale systems require both associates and customers to execute transactions by way of contact with a common touchscreen, an associate may use the touchscreen to inadvertently or intentionally modify the terms of a transaction without the customer's consent, e.g., by overcharging the customer for an order or canceling one or more goods or services from the order, while a customer may attempt to execute transactions on behalf of the associate, such as to add additional goods or services to an order, or to simulate paying for the order in whole or in part.

Furthermore, millions of customers routinely execute transactions in both the physical world, e.g., at bricks-and-mortar retail establishments, and in the virtual world, e.g., by way of one or more electronic marketplaces. Currently, existing point-of-sale systems are unable to bridge the gap between the physical and virtual worlds, such as to associate a customer's physical purchases from a bricks-and-mortar point-of-sale system with a profile of the customer that is maintained at an electronic marketplace.

BRIEF DESCRIPTION OF THE DRAWINGS

FIGS. 5A through 5D are views of aspects of one point-of-sale system in accordance with implementations of the present disclosure.

FIGS. 9A through 9C are views of aspects of one point-of-sale system in accordance with implementations of the present disclosure.

DETAILED DESCRIPTION

As is set forth in greater detail below, the present disclosure is directed to secure point-of-sale systems that offer enhanced interactivity to customers and associates during the completion of transactions. In some implementations, the point-of-sale systems may include display assemblies for independently supporting separate interactive displays for customers and associates, respectively; stand assemblies that are joined to the base assemblies and provide structural support for the display assemblies; and base assemblies that are configured for secure mounting to fixtures such as cash wraps, countertops, tables or other features in a retail environment. Computer devices for controlling the operation of the point-of-sale systems and are in communication with the display assemblies may be securely disposed within such fixtures, e.g., below a countertop, a table or another panel to which the base assemblies are mounted, in order to minimize the risk that the computer devices may be adversely affected by inadvertent or negligent actions (e.g., spills or unwanted contact), intentional tampering or theft.

In some implementations, the point-of-sale systems include a pair of discrete stations, stations or units that are mounted to a common fixture, e.g., a counter or another panel of a cash wrap or other area. Each of the stations includes an interactive display that is aligned to face in opposite directions with respect to the common fixture, thereby enabling independent and discreet viewing and interaction by customers and associates on opposite sides of the common fixture. Orienting the interactive displays in opposite directions enables the point-of-sale system to physically separate the interactions of a customer and an associate, respectively, from one another, and to effectively provide an invisible barrier between the interactions of the customer and the interactions of the associate. Furthermore, in some implementations, the point-of-sale systems may include payment instrument readers (e.g., credit card readers) provided in association with the display assemblies that are configured for use by customers. In such implementations, a customer may present a payment instrument to a reader, and an identifier of the payment instrument (e.g., a credit card number) that is obtained thereby may be used to identify the customer. The identifier may also be used to determine whether the customer has an account at an electronic marketplace (e.g., an online marketplace), to configure the operation of the respective display assemblies in a manner consistent with a profile of the customer, and to associate any transactions executed by the customer at the point-of-sale systems with the profile of the customer maintained by the electronic marketplace.

Figure 1A:
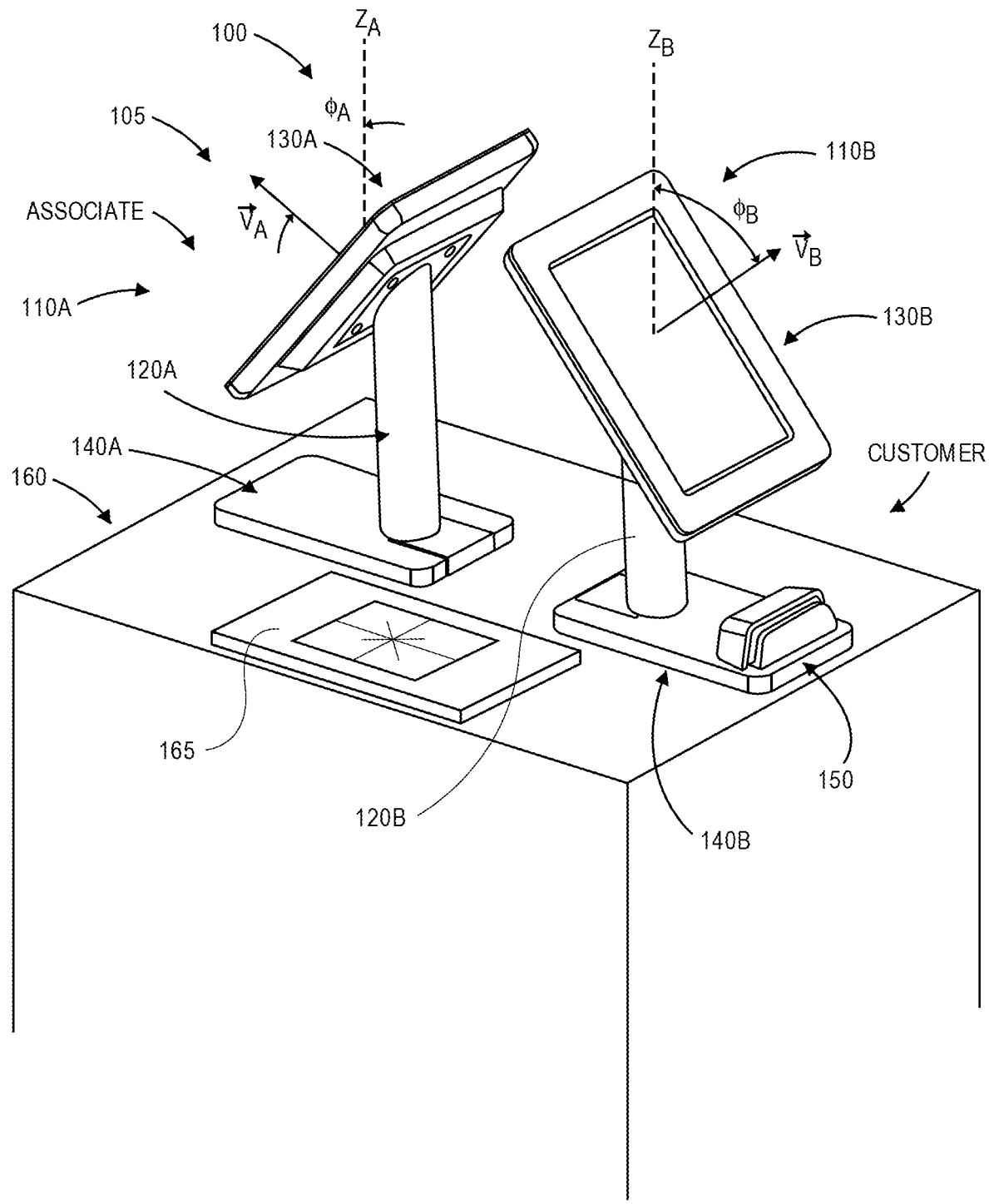
FIGS. 1A and 1B are views of aspects of one system including a point-of-sale system in accordance with implementations of the present disclosure.
Figure 1B:
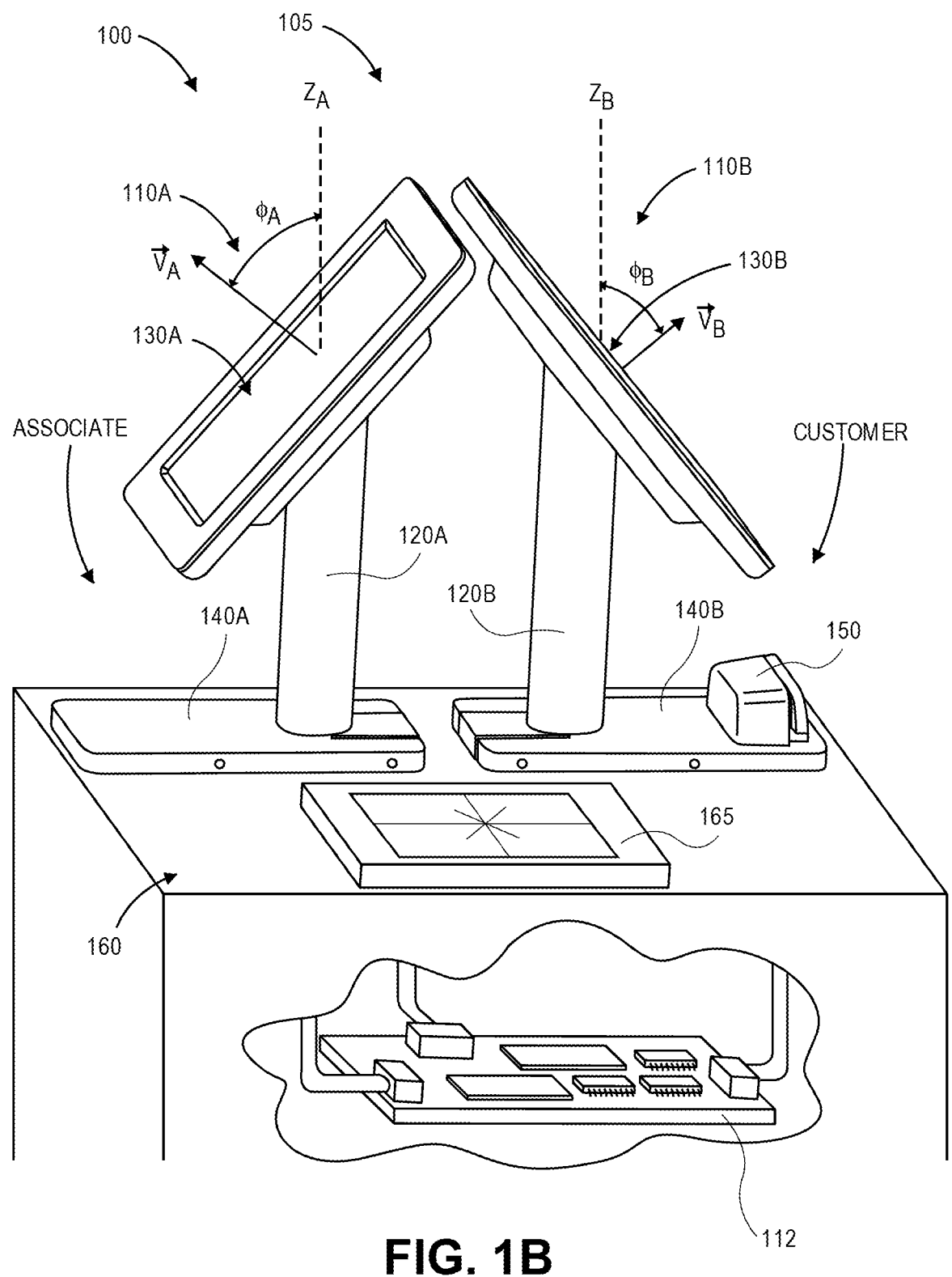

Referring to FIGS. 1A and 1B, views of aspects of a system 100 including a point-of-sale system 105 in accordance with implementations of the present disclosure are shown. The point-of-sale system 105 includes an associate station 110A and a customer station 110B, each of which is mounted to a cash wrap 160 (or counter, or table, or fixture) having a scanner 165 mounted thereon. The associate station 110A includes a stand assembly 120A, a display assembly 130A and a base assembly 140A mounted near a left side of the cash wrap 160. The stand assembly 120A includes a column that defines an axis $z_A$ and has a proximal end mounted in a substantially vertical orientation with respect to an upper panel of the cash wrap 160, near the left side of the cash wrap 160. Although the column of the stand assembly 120A is shown as having a round cross-section, the stand assembly 120A may have any shapes or dimensions, including but not limited to rectangles, triangles or any other regular or irregular shapes, and any lengths, diameters or thicknesses.

The display assembly 130A is mounted to a plate provided at a distal end of the stand assembly 120A, which is aligned at a non-horizontal angle $\Phi A$ with respect to the axis $z_A$ defined by the stand assembly 120A. In some implementations, the non-perpendicular angle $\Phi A$ is provided at approximately thirty to sixty degrees (30° to 60°) from the axis $z_A$ defined by the stand assembly 120A, or approximately thirty to sixty degrees (30° to 60°) from a horizontal plane. Therefore, an associate having nearly any height who is positioned on the left side of the cash wrap 160 (e.g., at an associate interaction position) may easily view and interact with an interactive display provided within the display assembly 130A. The base assembly 140A is a covering over at least a portion of an upper panel of the cash wrap 160 where the proximal end of the stand assembly 120A is installed therein.

Similarly, the customer station 110B includes a stand assembly 120B, a display assembly 130B, a base assembly 140B and an instrument reader 150 mounted near a right side of the cash wrap 160. The stand assembly 120B includes a column that defines an axis $z_B$ and has a proximal end mounted in a substantially vertical orientation with respect to the upper panel of the cash wrap 160, near the right side of the cash wrap 160, opposite the associate station 110B. Although the column of the stand assembly 120B is shown as having a round cross-section, the stand assembly 120B may have any shapes or dimensions, including but not limited to rectangles, triangles or any other regular or irregular shapes, and any lengths, diameters or thicknesses. Moreover, the shapes and dimensions of the stand assembly 120B may be the same as the shapes and dimensions of the stand assembly 120A, or may have different shapes or dimensions.

The display assembly 130B is mounted to a plate provided at a distal end of the stand assembly 120B, which is aligned at a non-horizontal angle $\Phi_B$ with respect to the axis $z_B$ defined by the stand assembly 120B. In some implementations, the non-horizontal angle $\Phi_B$ is provided at approximately thirty to sixty degrees (30° to 60°) from the axis $z_B$ defined by the stand assembly 120B, or approximately thirty to sixty degrees (30 to 60°) from a horizontal plane. Additionally, the base assembly 140B is a covering over at least a portion of an upper panel of the cash wrap 160 where the proximal end of the stand assembly 120B is installed therein, and the instrument reader 150 is installed on an upper panel of the base assembly 140B. Therefore, a customer having nearly any height who is positioned on the right side of the cash wrap 160 (e.g., at a customer interaction position) may easily view and interact with an interactive display provided within the display assembly 130B, and also with the instrument reader 150. For example, a customer may swipe or insert a credit card, a debit card or another instrument into the instrument reader 150, and an identifier of the instrument or the customer may be determined thereby. The identifier of the instrument or the customer may be used to complete a transaction, e.g., to authorize a payment for a purchase of one or more items, or to associate the transaction, the purchase or the items with a profile of the customer maintained at an electronic marketplace. The scanner 165 may be any device for recognizing one or more commercial items at the cash wrap 160, and may include any type or form of bar code reader, an imaging sensor or device, a radiofrequency identification ("RFID") reader, a scale, an imaging device, or any other type or form of sensor. In some implementations, the scanner 165 may be handheld, and may be configured to communicate via wired or wireless means. Additionally, the scanner 165 may perform one or more of the functions of the instrument reader 150, such as to recognize an identifier of an instrument or a customer.

As is shown in FIG. 1B, each of the display assemblies 130A, 130B and the instrument reader 150 is connected to a computer device 112 within an interior chamber beneath the upper panel of the cash wrap 160, e.g., by one or more cables extending through openings within the stand assemblies 120A, 120B. The computer device 112 may be any suitably sized computer device or system having one or more processors and/or memory components that may be suitably accommodated within the interior chamber of the cash wrap 160. In some implementations, the computer device 112 may be a single-board computer. The computer device 112 may be in communication with one or more other computer devices (not shown) by way of one or more computer networks, which may include the Internet in whole or in part.

Furthermore, the non-horizontal angles $\Phi_A$, $\Phi_B$ of the plates to which the display assemblies 130A, 130B are mounted at the distal ends of the stand assemblies 120A, 120B are aligned in opposite directions, such that an associate on the left side of the cash wrap 160 may view and interact with the display assembly 130A, outside of the field of view of a customer, and without any participation or assistance from the customer. For example, as is shown in FIGS. 1A and 1B, vectors VA, VB extending from centroids of each of the respective display assemblies 130A, 130B provided at the non-horizontal angles $\Phi_A$, $\Phi_B$ each include a vertical component and a horizontal component, with each of the vertical components extending upward, and each of the horizontal components extending in opposite directions from one another.

Likewise, a customer on the right side of the cash wrap 160 may view and interact with the display assembly 130B or the instrument reader 150, outside of the field of view of the associate, and without any participation or assistance from the associate. Alternatively, in some other implementations, a second instrument reader (not shown) may be installed on an upper panel of the base assembly 140A, and operated by the associate to complete a transaction with a payment instrument of the customer, e.g., to authorize a payment for a purchase of one or more items, or to associate the transaction, the purchase or the items with a profile of the customer maintained at an electronic marketplace.

Accordingly, the systems and methods of the present disclosure include point-of-sale systems featuring separate and distinct interactive displays for use by associates and customers, respectively, during the execution of one or more transactions at a cash wrap or like facility. The interactive displays may be mounted at any desired height or angle of orientation in order to accommodate their use by associates or customers of nearly any height, including associates or customers operating wheelchairs, walkers or other walking aids, or any associates or customers who might require another form of assistance.

The systems and methods disclosed herein enable customers and retailers to securely complete transactions in a bricks-and-mortar retail environment while creating an experience that is secure, private and comfortable for customers, and providing an easy-to-use interface for associates. In some implementations, the substantially larger and vertically oriented screens of the display assemblies may be programmed not only to display information to a customer and to receive interactions from the customer but also to provide advertisements, details or recommendations regarding one or more products or services that may be available at the retail environment or from one or more electronic marketplaces. The construction of the base assemblies, the stand assemblies and the display assemblies enables the respective parts to operate in a modular fashion while minimizing the overall cost of the hardware and also the long-term maintenance required by the point-of-sale system. Moreover, the modular nature of the respective parts enables the stations of the point-of-sale system to be readily modified to accommodate interactive displays of various sizes or technological features and also to be mounted to any type of panels or in any locations, or relocated from one panel or location to another, without requiring a wholesale redesign of the entire point-of-sale system, of any of the assemblies from which the stations are formed. Furthermore, in some implementations, a display apparatus may be oriented and configured to satisfy accessibility requirements or regulations for accommodating physically handicapped and visually handicapped customers, including one or more of such requirements or regulations established in accordance with the Americans with Disabilities Act or other state or federal legislation.

In some implementations of the present disclosure, a point-of-sale system may include one or more stations, e.g., a station for a customer and a station for an associate, each of which includes a stand assembly, a display assembly and a base assembly. The stand assembly is provided to mount the display assembly to the base assembly and, therefore, to a cash wrap or other fixture. The display assembly is provided to form a housing around an interactive display (e.g., a touchscreen display) and to mount the housing to the stand assembly, e.g., by one or more screws, bolts or other fasteners. The base assembly is provided to mount the display assembly, by way of the stand assembly, to a cash wrap or other fixture in a defined orientation or alignment. Additionally, the base assembly may also be configured to mount an instrument reader, a multimedia port (e.g., an audio jack) or any other components thereto.

In some implementations, a station that is configured for operation by an associate, e.g., the station 110A of FIGS. 1A and 1B, may include each of the features or components of a station that is configured for operation by a customer, e.g., the station 110B of FIGS. 1A and 1B. In some other implementations, an associate station may be configured with more, fewer or different features or components than a customer station. For example, referring again to the stations 110A, 110B of FIGS. 1A and 1B, the customer station 110B includes the instrument reader 150 (e.g., a credit card or bank card reader), while the associate station 110A does not include any form of instrument reader.

The point-of-sale systems of the present disclosure may include one or more standalone "above-the-counter" units or stations, preferably two of such units or stations, including one unit or station configured for operation by a customer and another unit or station configured for operation by an associate of a retail establishment. In some implementations, an associate and a customer may complete a transaction using their respective units or stations, e.g., by presenting and accepting offers for the purchase, rent, lease or borrowing of one or more items, and by exchanging consideration for the one or more items, such as by authorizing the deduction of one or more charges from an account associated with a payment instrument. The point-of-sale systems may further include one or more "below-the-counter" computer devices in communication with the respective units or stations, e.g., by wired or wireless means. For example, the point-of-sale systems may include any type or form of computer devices, including but not limited to a single-board computer, an off-the-shelf computer, or any other computer device. In some implementations, a maximum height of a visible area of an interactive display is approximately forty-eight inches (48") above an associated working surface from which an associate or a customer may operate the interactive display. Furthermore, the interactive displays of the point-of-sale system may be aligned in any orientation, e.g., portrait or landscape. In some implementations, the interactive displays may be aligned in a portrait orientation, such that a torso of an associate or a customer may readily obscure information or data displayed thereon from one or more other associates or customers, e.g., customers forming a line behind a customer who is executing a transaction by way of the interactive display. In other implementations, the orientations of the interactive displays may be adjusted or modified by or on behalf of an associate or a customer, as desired.

Additionally, the units or stations may be configured to mount to panels or other features of cash wraps, counters, tables or other fixtures with limited modifications, and may have modular designs that enable one or more components to be replaced simply and easily without requiring a disassembly of the entire point-of-sale system. For example, when an interactive display requires a software or firmware upgrade, or a repair or replacement of one or more components, a display assembly that houses the interactive display may be disconnected from the stand assembly to which the display assembly is mounted in order to enable the interactive display to be upgraded, repaired or replaced, e.g., with a customized interactive display, or with an off-the-shelf equivalent. The components of the point-of-sale system may be sealed or shrouded to provide protection against damage due to ordinary wear-and-tear, accidents or spills, or negligent or intentional malfeasance.

The stand assemblies of the present disclosure are the backbones of the respective units or stations that enable interaction with point-of-sale systems by an associate or a customer. In some implementations, two stand assemblies are mounted to a cash wrap or another fixture to provide mounting interfaces for both the display assemblies and the base assemblies, as well as a secure conduit for the routing of cables coupling the respective display assemblies and one or more computer systems, which may be housed beneath the cash wrap or other fixture, or in one or more alternate locations.

The display assemblies of the present disclosure include housings or other support structures for mounting one or more interactive displays of the point-of-sale systems, e.g., at non-horizontal angles, and are releasably mounted to the stand assemblies, e.g., by one or more fasteners or other hardware. The display assemblies may include one or more bezels, gaskets, electromagnetic interference (EMI) shielding layers or housings surrounding an interactive display in whole or in part. The display assemblies are mounted in a manner that causes the interactive displays to face in opposite directions from one another, such that an associate may not view or interact with an interactive display operated by a customer, and that the customer may not view or interact with an interactive display operated by the associate.

The base assemblies of the present disclosure are support structures to which one or more instrument readers, media connection or other interactive features may be mounted in a manner that enables access by an associate or a customer from discrete interaction positions. Typically, a base assembly is a module or modular component that is joined to a portion of the stand assembly at or near where the stand assembly is mounted to a cash wrap or other fixture via one or more screws or other fasteners. In some implementations, e.g., a station provided for interaction with a point-of-sale system by an associate, the base assembly need not include any such readers, jacks or interactive features, and may merely provide a protective cover over a region where the stand assembly mates with the cash wrap or other fixture. In other implementations, e.g., a station provided for interaction with a point-of-sale system by a customer, the base assembly may include an instrument reader such as a magnetic card reader, a NFC reader, an RFID reader, or any other type or form of reading device, as well as a media connection such as an audio port. The instrument reader may include a cover (e.g., a plastic cover) that acts as a physical barrier to skimming or other surreptitious attempts to install a substitute or additional card reader therein for fraudulent purposes, and also conceals any other connections (e.g., Universal Serial Bus, or USB, ports) to the instrument reader. The media connection may include one or more boards having components for interfacing with media accessories of an associate or a customer. For example, in some implementations, the media connection may include an audio board having a 3.5 millimeter (3.5 mm) audio port (e.g., an audio jack), or any other type or form of audio port, that faces a side of a cash wrap or other fixture where it is anticipated that a customer will position himself or herself, e.g., in compliance with one or more accessibility regulations or requirements, in order to interact with the point-of-sale system.

The stand assemblies, the display assemblies and the base assemblies are configured to securely accommodate one or more wired connections between an interactive display housed within a display assembly and one or more computer systems that may be provided beneath or within a cash wrap or other fixture, or one or more wired connections between an instrument reader (e.g., a card reader, a NFC reader, or any other reader) hosted by a base assembly and the one or more computer systems. In some implementations, an interactive display within a display assembly may include a USB port having any number of pins or other connections, e.g., a four-wire connection or a nine-wire connection, for providing power and data to the interactive display and for receiving data regarding interactions with the interactive display therefrom, and such ports may be joined to such computer systems by a USB cable connected thereto. The interactive displays may be configured with any type of ports and configured to receive any type or form of cables or other wired connectors thereto, and such connectors may be accommodated within the display assemblies, the stand assemblies and/or the base assemblies, as required. Similarly, a base assembly may include one or more conduits for accommodating cables or connectors (e.g., USB cables) extending between an instrument reader mounted to the base assembly and a computer system disposed beneath a cash wrap or other fixture, as well as a media cable or connector (e.g., an audio cable) extending between a media port (e.g., an audio jack) and such a computer system. Moreover, components of the point-of-sale systems disclosed herein may include one or more routing features for relieving stresses or strains on wired connectors, including but not limited to plates, guides, clamps or grips, and conduits that are constructed with sufficient dimensions for accommodating bending or slack in the wired connectors. The point-of-sale systems of the present disclosure may further include one or more features for minimizing EMI or for ensuring electromagnetic compatibility (or "EMC") of the one or more components associated therewith.

The point-of-sale systems of the present disclosure provide a number of advantages to customers, as compared to existing point-of-sale systems. For example, the point-of-sale systems disclosed herein will enable a customer to swipe a credit card or bank card, present a near field communications instrument, display a mobile device having a bar code (e.g., a one-dimensional or two-dimensional bar code, such as a quick response or "QR" code) displayed thereon, without handing the card or other instrument to an associate, while keeping the customer's personal information private (e.g., by obscuring or obfuscating one or more account numbers, addresses or other details from view, and by preventing an associate from viewing such numbers, addresses or details). The interactive displays that are housed within the display assemblies present information in a clear and crisp fashion, and also permit customers of varying statures to view and interact with such displays from several angles. Moreover, by providing multiple interactive displays that are each directly connected to a computer system, the point-of-sale may minimize the latency associated with the execution of an action (e.g., an addition of an item to a cart, a recognition of the item, a presentation of a coupon or a voucher or an authorization or confirmation of a payment instrument) and a display of information associated with that action.

The point-of-sale systems of the present disclosure also provide a number of advantages to associates, as compared to existing point-of-sale systems. For example, the interactive displays may enable associates to quickly and easily authenticate themselves, e.g., by entering a user name and/or password or presenting an authenticating device, outside of the fields of view of customers or other personnel. The associate may also easily scan an item at a cash wrap, or manually enter information regarding the item via the interactive displays. The associate may benefit from many of the same viewing, convenience and security benefits as the customer, including but not limited to the ability to view or interact with an interactive display from varying angles or in various lighting conditions, and to interact with a point-of-sale computer system with minimum latency. In some implementations, a station that is provided for associate interaction may also include an instrument reader that enables the associate to assist a customer with authorizing a transaction, or to manually enter an identifier of a payment instrument (e.g., a credit card number) in the event of a reader failure or other fault.

The point-of-sale systems of the present disclosure may feature a number of security enhancements, including but not limited to a modular construction that enables the replacement of one or more components (e.g., a display, a reader, an audio jack or a computer system) without compromising the security of the entire systems. Additionally, the point-of-sale systems may be constructed in a tamper-resistant fashion (e.g., by restricting access to specific components or connectors between such components) and/or a tamper-evident fashion (e.g., such that attempts to tamper with components or connectors will be visually evident). For example, the various components of the point-of-sale system may be assembled using secure fasteners such as secure screws, tamper-resistant screws, one-way screws, or other like means. The point-of-sale systems disclosed herein also feature a number of accessibility enhancements. For example, the audio ports or jacks enable associates or customers who are visually impaired to interact with the point-of-sale system by way of an audio output device, while the angled construction of the stand assemblies, and the angled orientations of the display assemblies, enable associates or customers of various heights to operate the point-of-sales system by interacting with either of the interactive displays, while standing or seated (e.g., in a wheelchair).

Figure 2:
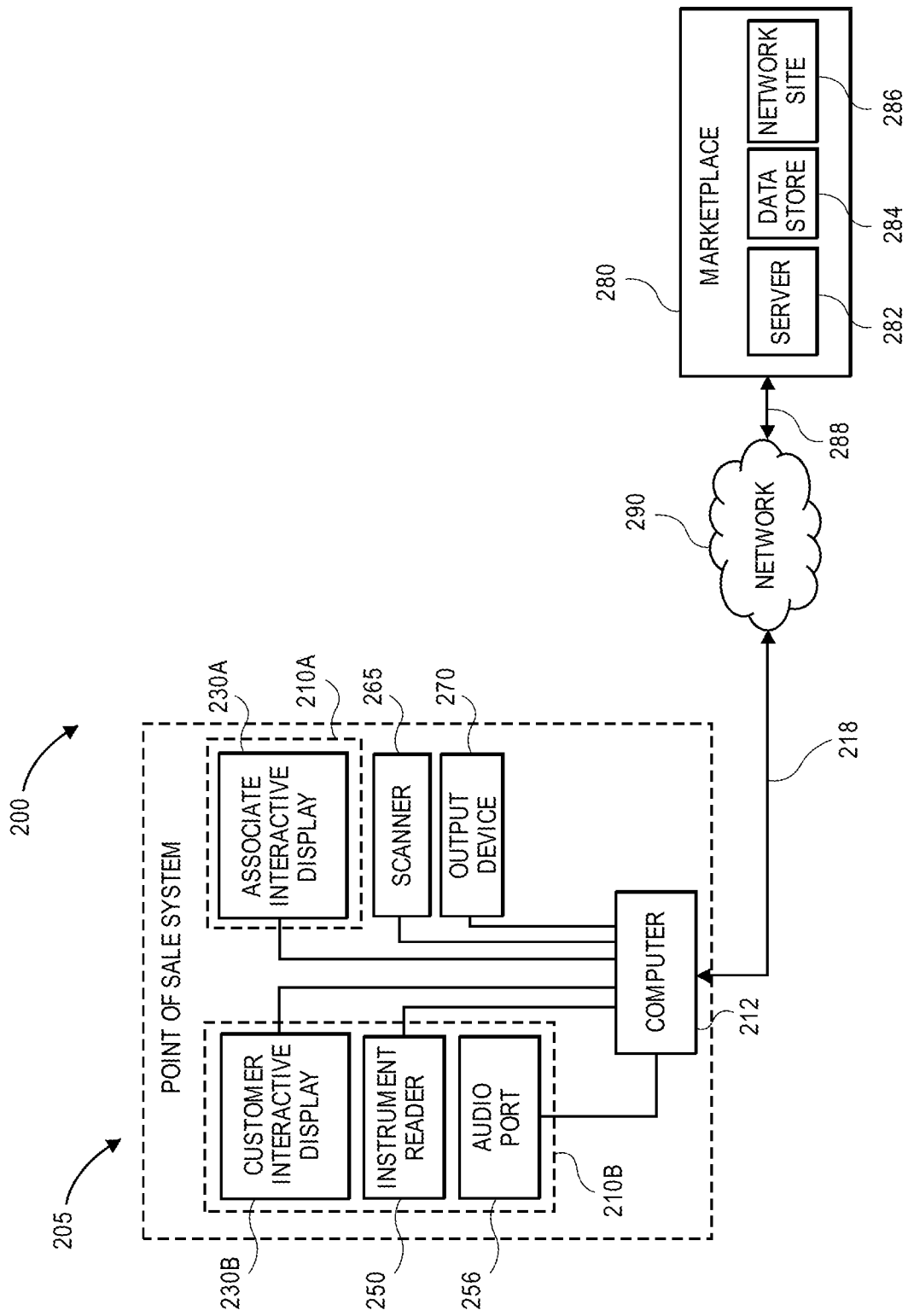
FIG. 2 is a block diagram of components of one system including a point-of-sale system in accordance with implementations of the present disclosure.

Referring to FIG. 2, a block diagram of components of one system 200 including a point-of-sale system 205 in accordance with implementations of the present disclosure is shown. Except where otherwise noted, reference numerals preceded by the number "2" in FIG. 2 refer to elements that are similar to elements having reference numerals preceded by the number "1" shown in FIGS. 1A and 1B.

As is shown in FIG. 2, the system 200 includes the point-of-sale system 205 and a marketplace 280 that are connected to one another across a network 290, which may include the Internet in whole or in part.

The point-of-sale system 205 includes an associate station 210A, a customer station 210B, a scanner 265 and an output device 270 that are connected to a computer device 212, which is connected to the network 290 by one or more wired or wireless connections or protocols. The computer device 212 may be any type of computer device or system having one or more processors and/or memory components. For example, in some implementations, the computer device 212 may be a single-board computer having one or more processors, memory components, input/output devices or ports, or any other components. Alternatively, in some implementations, the computer device 212 may be any off-the-shelf or customized computer device. The associate station 210A includes an associate interactive display 230A in communication with the computer device 212. The interactive display 230A may be any type or form of monitor or other form of display device that may render content (e.g., pages of information or data of any kind) and also receive interactions from an associate thereon. The interactive display 230A may be mounted within a housing or other aspects of a display assembly, such as the display assembly 130A of FIG. 1A and FIG. 1B, at any heights and in any angular orientations with respect to vertical axes and/or horizontal planes in an environment where the interactive display 230A is provided.

In some implementations, the interactive display 230A may be a capacitive touchscreen that operates by detecting bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance at a location touched by the body (e.g., a digit such as a finger or thumb) within the capacitive touchscreen, due to disruptions in electrical fields caused by the body's presence. The extent of the change in capacitance is determined based on any electrical resistance between the body and the capacitive touchscreen, which may be a function of any moisture, electrolytes or other substances that may be present on the capacitive touchscreen, or any other factors. Capacitive touchscreens may thus detect not only that a capacitive touchscreen has been selected or contacted, but also a location of the selection or contact, viz., a size of a selected region, a shape of the selected region, and a coordinate or coordinates associated with the selected region on the capacitive touchscreen, and may generate input data based on the location of the selection or contact. Moreover, a capacitive touchscreen may further accept and interpret multiple selections or contacts with a capacitive touchscreen, as well as the execution of one or more taps, touches or gestures (e.g., moving strokes of one or more fingers) on the capacitive touchscreen.

In some such implementations, where the interactive display 230A is a capacitive touchscreen, the interactive display 230A may comprise a layered stack of specific components, beginning first with a clear protective layer that may be formed from glass, plastic or other suitable materials. A protective layer may then be adhered to one or more sensors, which may be formed from sublayers of a substantially transparent conductive material such as indium tin oxide (or "ITO") surrounding a separating air gap. A conductive grid or pattern may be carved or etched into the ITO sublayers of the sensors, and the grid or pattern may be associated with a coordinate system (e.g., an x-y grid on the capacitive touchscreen). Such sensors may further be adhered to an electronic display, such as by affixing the sensors atop a liquid-crystal display (or "LCD"). In this regard, a coordinate system of the sensors may be associated with the underlying LCD and the content rendered thereon.

When a user touches a protective layer of the interactive display 230A with a finger, which is a conductor, a change in the effective capacitance between the ITO sublayers, which are also conductors, at a point or points of contact with the protective layer is introduced. Such contact thereby causes disruptions in electrical fields in the vicinity of one or more of the ITO sublayers, and internal current flows. One or more monitors in each dimension of the pattern or coordinate system (e.g., an x-monitor and a y-monitor) may determine where, on the interactive display 230A, such changes in capacitance, which typically have values on the order of approximately one picofarad (pF), are observed. A location of the disruptions in the electrical fields, and the resulting changes in capacitance, may be determined with respect to the coordinate system, and input data representative of the location of the disruptions may be generated accordingly. For example, where a conductive grid or pattern is defined in the ITO layers of a sensor, the changes in capacitance may be identified with respect to the one or more regions of the grid or pattern where such disruptions were observed. These regions may be determined to correspond with the locations of contact with the protective layer. The input data may be correlated with content displayed on the interactive display 230A at a time of the contact.

In some implementations, the interactive display 230A may be a resistive touchscreen including a touch-sensitive computer display composed of multiple flexible sheets that are coated with a resistive material and separated by an air gap. When a user contacts a viewing surface of a resistive touchscreen, at least two flexible sheets are placed in contact with one another. Such flexible sheets may further include horizontal and vertical lines that, when the flexible sheets are placed into contact with one another, determine a location of the user's contact with the flexible sheets, and input data representative of the location of the contact may be generated accordingly. Because such contact is registered by manually driven electrical contact, a user may interact with a resistive touchscreen using his or her fingers or hands (which may be gloved or ungloved), as well as a stylus, pointer or other object. The input data may be correlated with content displayed on the interactive display 230A at a time of the contact.

The interactive display 230A may be coupled with or connected to the computer device 212 by any means, including but not limited to a Universal Serial Bus (or "USB") cable, such as a USB 2.0, USB 3.0, USB-C, mini-USB, micro-USB; a high-definition multimedia interface (or "HDMI") cable, such as a Standard or High Speed cable; an Ethernet cable, such as a Category 3, 5, 5e, 6, 6a or 7 cable; or any other connector. Alternatively, the interactive display 230A may communicate with the computer device 212 wirelessly, such as by Wireless Fidelity (or "Wi-Fi"), or any other wireless protocol.

The customer station 210B may include a customer interactive display 230B, an instrument reader 250 and an audio port 256. The customer interactive display 230B may have any of the features and/or capacities of the associate interactive display 230A discussed above. In some implementations, the customer interactive display 230B may be of the same model, type or form as the associate interactive display 230A, such as with the same dimensions, orientations, features or capacities. In other implementations, the customer interactive display 230B may be of a different model, type or form than the associated interactive display 230A. The instrument reader 250 may be a data input device configured to read and interpret data from a payment instrument, including but not limited to a card (e.g., a credit card or a debit card) having a magnetic strip, a bar code, a chip or another storage medium or identifier associated therewith, as well as a computer device such as a smartphone, a tablet computer or a wristwatch having a bar code or other identifier displayed thereon, or is configured for wireless communication with the instrument reader 250.

In some implementations, the instrument reader 250 may be configured for wireless communication according to any protocol, including but not limited to Bluetooth®, NFC or RFID. For example, Bluetooth® technology includes both a radio-frequency standard and also a protocol followed by connected devices, under which devices agree as to when and how information will be transmitted and as to how the successful reception of transmitted information will be confirmed by the devices. Bluetooth® technology permits a variety of devices to communicate with one another, even in a crowded radio frequency environment, as each Bluetooth®-enabled device has a unique 48-bit Bluetooth® Device Address (or BD_ADDR) defined according to Institute of Electrical and Electronics Engineers (IEEE) 802 standards. For example, two or more Bluetooth®-enabled devices may be connected to one another, or "paired," to form a wireless ad hoc network known as a "piconet," or Personal Access Network (or PAN). Bluetooth® transmissions are sent within an industrial, scientific and medical (ISM) radio frequency range of approximately 2.400 to approximately 2.500 gigahertz (GHz), with a center frequency of approximately 2.450 GHz, and at low powers, such as approximately one 17 milliwatts (mW), or 0.001 watts (W). Bluetooth® components operate according to a frequency-hopping spread spectrum (FHSS) method, which operates by switching carriers across multiple frequency channels and transmitting communications in small segments, and in respective time slots. Bluetooth® may be used to establish a wireless link between any types of compatible devices, such as between a computer and a wireless keyboard, between a media player or mobile telephone and a wireless headset, or between a media player and an amplifier, such as those that are included in an automobile audio system.

RFID is a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices. RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Similarly, NFC is an RFID-based short-range half duplex communication protocol that operates by inductive coupling between transmitting and receiving devices (e.g., initiator and target devices). Devices that communicate via NFC are typically located within a few centimeters (e.g., four to ten centimeters) of one another, and transmit data according to an operating frequency of approximately 13.56 megahertz (13.56 MHz). Other wireless protocols may include induction wireless, infrared wireless (such as technologies operating according to specifications and protocols provided by the Infrared Data Association, or IrDA), ultra wideband, or acoustic-based data transfer. The protocols and components for enabling computing devices to communicate with one another according to such protocols are well known to those skilled in the art of computer communications.

In some implementations, the instrument reader 250 may comprise a slot, which may be used to receive and slide a card therethrough, and to obtain information from the card for a variety of purposes. For example, when a customer slides a card into or through the slot, the instrument reader 250 may obtain information stored on the card (e.g., account number, account holder's name, expiration date, or the like), and use this information to identify the customer, or for payment processing. The instrument reader 250 may further comprise one or more connectors, which may be used to connect the instrument reader 250 to the computer device 212, or to provide power to the instrument reader 250. The instrument reader 250 may comprise a plurality of other hardware components, including a random-access memory (RAM) chip or a hard drive, as well as one or more processors configured to execute a series of instructions stored in the memory. The instrument reader 250 may also be configured to compare credential information obtained from a card to credential information persistently stored within the instrument reader 250, within the computer device 212 or within one or more external devices, e.g., a server 282 associated with the marketplace 280.

The instrument reader 250 may be coupled with or connected to the computer device 212 by any type or form of cable, e.g., a USB cable, or according to any other wired or wireless protocol (e.g., Wi-Fi). Alternatively, the instrument reader 250 may be directly connected to the network 290, according to any wired or wireless protocol.

The audio port 256 is a socket, jack or other opening that is configured to receive a mating connection from a corresponding audio output device, including but not limited to in-ear headphones, over-ear headphones, on-ear headphones, or any other type or form of audio device. In some implementations, the audio port 256 may be a 3.5 millimeter (3.5 mm) audio port having any number of contacts (e.g., tip, ring and/or sleeve contacts) for receiving an audio connector from a set of headphones or other audio device of any size, shape or form. The audio port 256 may be configured to provide audio signals that mimic or complement video signals displayed on the customer interactive display 230B, thereby enabling the customer station 210B to be operated by one or customers having varying degrees of vision impairment. In other implementations, the audio port 256 may be a one-quarter inch port. In still other implementations, the audio port 256 may include a plurality of RCA ports, a USB port, an HDMI port, an Ethernet port, or the like. The audio port 256 may be configured to provide power to one or more devices connected thereto, e.g., to charge such devices, in addition to audio signals.

In some implementations, the audio port 256 may be replaced by a wireless audio transceiver or like device that is configured to transmit audio signals to one or more audio output devices according to one or more wireless protocols (e.g., Bluetooth®), rather than via a wired connection. Additionally, the audio port 256 may be either female or male in nature, and configured to connect with a corresponding male or female audio connector, as appropriate.

The scanner 265 may be any type or form of device for recognizing one or more commercial items at a cash wrap or other suitable location where the point-of-sale system 205 is provided. For example, in some implementations, the scanner 265 may be any type or form of bar code reader, such as a pen-type or laser scanning reader, which may measure intensities of reflected light and generate a waveform or other signal for measuring widths of bars and spades in the code, and decode the waveform or signal in order to determine the coded information associated with the bar code. Alternatively, the scanner 265 may be an imaging sensor or device that may capture an image of one or more bar codes simultaneously, and decode the bar codes by identifying respective contrasts between the corresponding light and dark portions.

In some implementations, the scanner 265 may be an RFID reader configured to receive RFID data transfers from RFID tags associated with one or more items. In some implementations, the scanner 265 may include a scale configured to determine information or data regarding a mass of an item resting thereon, and to identify the item based at least in part on the mass. Furthermore, the scanner 265 may include an imaging device configured to capture imaging data regarding an object (e.g., colors, textures or outlines), which may be extracted from the imaging data in any number of ways, and an item may be identified thereby. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces. Furthermore, outlines of objects expressed in a digital image may be identified using one or more algorithms or machine-learning tools. Some such algorithms or tools may recognize edges, contours or outlines of objects in a digital image, or of portions of objects in the digital image, and may match the edges, contours or outlines of the objects against information regarding edges, contours or outlines of known objects, which may be stored in one or more data stores. The scanner 265 may be any other type or form of sensor, including but not limited to a data tag reader, a color sensor, a temperature sensor, a heat sensor or a motion sensor.

Alternatively, in some implementations, the scanner 265 may perform one or more of the functions of the instrument reader 250. For example, where the scanner 265 includes an imaging device or a bar code reader, the scanner 265 may capture imaging data regarding a payment instrument having an optically readable identifier thereon, such as a card or a device having a user interface having a bar code (e.g., a one-dimensional or two-dimensional bar code, such as a quick response or "QR" code) displayed or printed thereon. The scanner 265 and/or the computer 212 may interpret the identifier and recognize the payment instrument or a device associated with the payment instrument thereby.

The output device 270 may be any form of external output device not associated with the associate station 210A or the customer station 210B that may produce any form of output associated with one or more interactions with the associate station 210A or the customer station 210B, or one or more transactions completed at the point-of-sale system 205. For example, the output device 270 may be a printer configured to generate a hard-copy record of one or more transactions such as an invoice, a ledger or a receipt, as well as any related or corresponding information such as coupons, flyers, warranty records or other advertising or marketing materials. Such a printer may be configured to print onto standard-sized sheets of paper (e.g., 8½"×11" letter) or on custom-sized or specialty papers, such as one or more rolls of receipt paper. Additionally, the output device 270 may be an additional monitor, speaker or other output device that may assist an associate and/or a customer during the completion of a transaction. In some implementations, the output device 270 may be configured to transmit one or more records of a transaction or other information via an electronic message to a customer, to the marketplace 280 or to any other entity or individual.

The marketplace 280 may be any entity or individual that intends to make items from a variety of sources (e.g., vendors, manufacturers, merchants or sellers) available for download, purchase, rent, lease or borrowing by customers using a networked computer infrastructure, including one or more physical computer servers 282 and data stores 284 (e.g., databases) for hosting a network site 286. The marketplace 280 may be physically or virtually associated with one or more bricks-and-mortar facilities, such as a retail establishment at which the point-of-sale system 205 is provided. The network site 286 may be implemented using the one or more servers 282, which connect or otherwise communicate with the one or more data stores 284 as well as the network 290, as indicated by line 288, through the sending and receiving of digital data. Moreover, the data stores 284 may include any type of information regarding items that have been made available for sale through the marketplace 280, or ordered by customers from the marketplace 280, or any information or data regarding preferences of customers for one or more items. The data stores 284 may include any information or data regarding customers and items that the customers prefer or disfavor, including but not limited to histories of searching or browsing for information or data regarding such items, e.g., by way of the network site 286, or histories of purchasing such items or considering such items for purchase, e.g., by way of the point-of-sale system 205, the network site 286, or in any other manner. The marketplace 280 may be further associated with one or more physical fulfillment centers, warehouses or other facilities at which items may be received and stored, and from which such items may be distributed to one or more customers.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The point-of-sale system 205, the marketplace 280 and/or any associates, customers or other entities may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages or the like. For example, the point-of-sale system 205 may be adapted to transmit information or data in the form of synchronous or asynchronous messages to the marketplace 280 and/or one or more associates or customers, or to any other computer device in real time or in near-real time, or in one or more offline processes, via the network 290. Those of ordinary skill in the pertinent art would recognize that the point-of-sale system 205 and/or the marketplace 280, or any associates or customers, may operate any of a number of computing devices that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the computer device 212 or the server 282, or any other computers or control systems utilized by the point-of-sale system 205, the marketplace 280, or any associates or customers, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
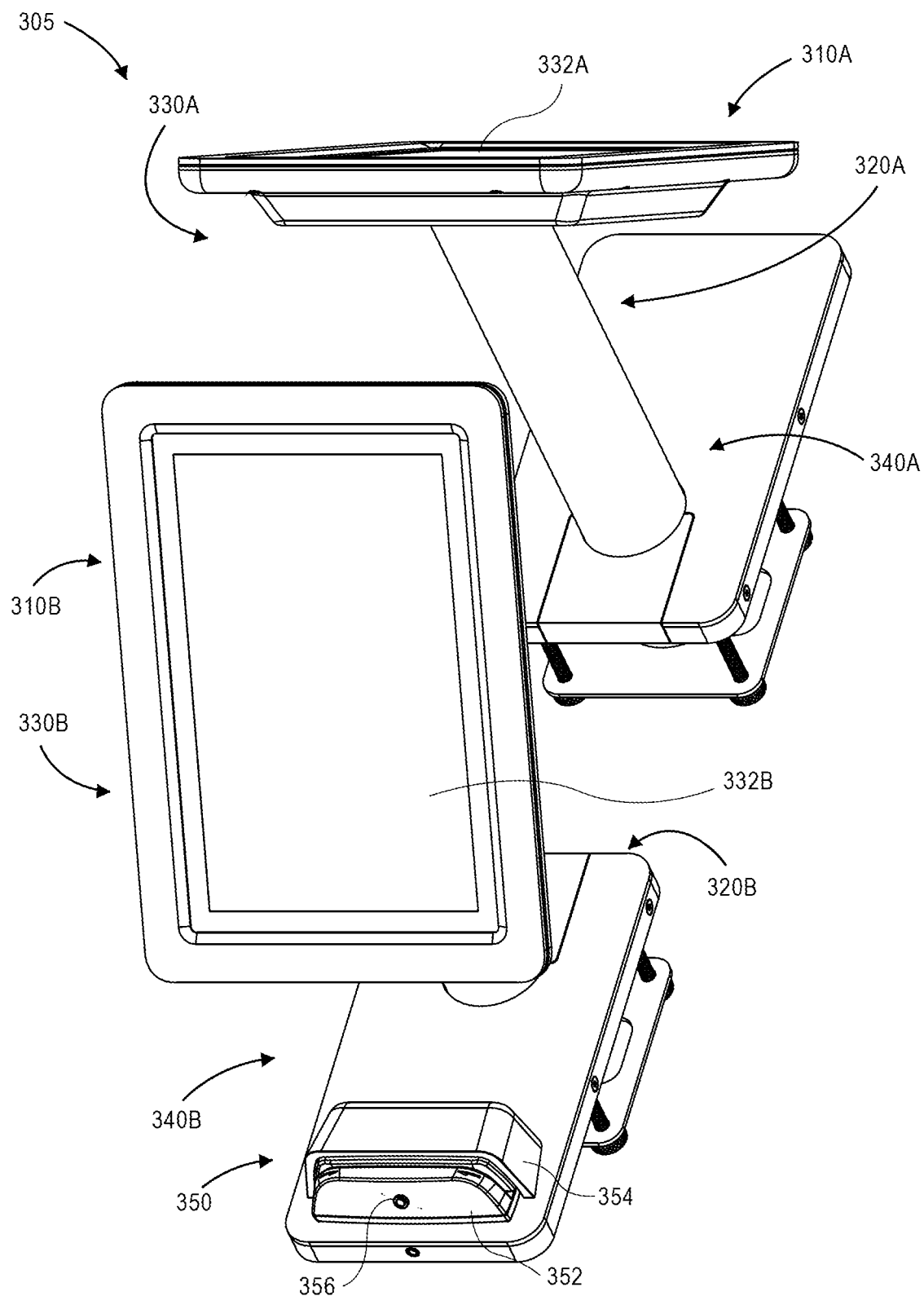
FIGS. 3A through 3C are views of aspects of one point-of-sale system in accordance with implementations of the present disclosure.
Figure 3B:
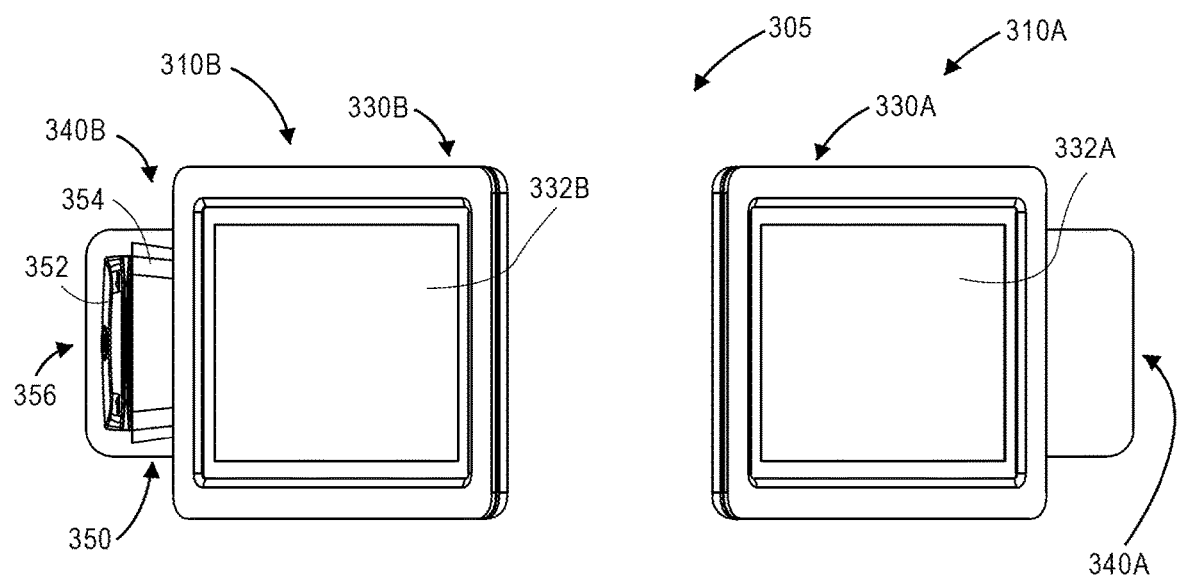
Figure 3C:
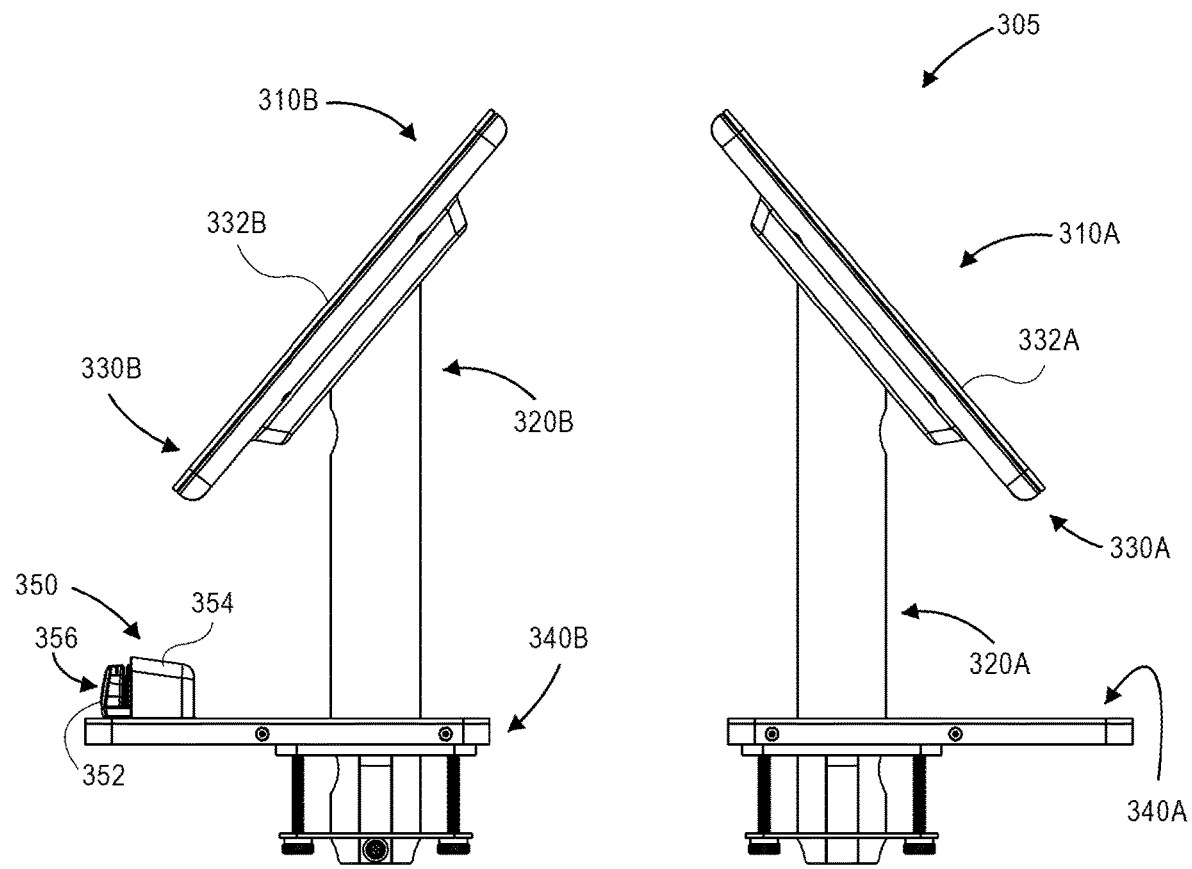

Referring to FIGS. 3A through 3C, views of aspects of one point-of-sale system 305 in accordance with implementations of the present disclosure are shown. Except where otherwise noted, reference numerals preceded by the number "3" in FIG. 3A, 3B or 3C refer to elements that are similar to elements having reference numerals preceded by the number "2" in FIG. 2 or by the number "1" shown in FIGS. 1A and 1B.

FIG. 3A is an upper perspective view of the point-of-sale system 305. FIG. 3B is a top view of the point-of-sale system 305. FIG. 3C is a side view of the point-of-sale system 305.

The point-of-sale system 305 includes an associate station 310A and a customer station 310B. The associate station 310A includes a stand assembly 320A, a display assembly 330A and a base assembly 340A. The stand assembly 320A includes a column that is configured for mounting to a panel of a cash wrap, a counter, a table or another fixture in a retail environment such as a convenience store, a department store, a grocery store, a book store or the like, and for supporting and aligning the display assembly 330A. At a proximal end (or a lower end) of the column, the stand assembly 320A includes an upper plate and a lower plate that are substantially parallel to one another and joined by a plurality of bolts or other threaded fasteners. In mounting the stand assembly 320A to a cash wrap, the lower plate may be removed, and the proximal end (or the lower end) of the stand assembly 320A may be inserted into a hole or other opening of the cash wrap or other fixture. The lower plate may then be rejoined to the upper plate, e.g., by the threaded fasteners, and the stand assembly 320A may be rigidly clamped in place, and aligned in an axis defined by the column that is perpendicular to the upper plate and the lower plate at the proximal end. For example, where a panel of a cash wrap or fixture to which the stand assembly 320A is joined is aligned substantially horizontally, the stand assembly 320A will be aligned substantially vertically.

At a distal end (or an upper end) of the column, the stand assembly 320A includes a mounting plate to which the display assembly 330A is mounted. The mounting plate at the distal end of the column is aligned at a non-perpendicular angle, such that the substantially flat display assembly 330A will be aligned at the same angle, and parallel to the mounting plate. In some implementations, the mounting plate at the distal end of the stand assembly 320A and the display assembly 330A are aligned at an angle of approximately fifty degrees (50°) with respect to a horizontal plane, or at an angle of approximate forty degrees (40°) with respect to the axis defined by the column. The base assembly 340A comprises one or more substantially horizontal plates or components that mate with the stand assembly 320A at or near where the proximal end of the stand assembly 320A is inserted through a panel of a cash wrap, a counter, a table or another fixture.

The customer station 310B includes a stand assembly 320B, a display assembly 330B and a base assembly 340B. Each of the stand assembly 320B, the display assembly 330B and the base assembly 340B may be mounted to a cash wrap or other fixture in a manner similar to that described above with regard to the stand assembly 320A, the display assembly 330A and the base assembly 340A of the associate station 310A. Additionally, as is shown in FIGS. 3A through 3C, the base assembly 340B further includes an instrument reader 350 including a swipe reading system 352, a cover 354 and an audio port 356 mounted thereto. The swipe reading system 352 may be a magnetic card reader or any other type or form of reading device for detecting information or data from a payment instrument (e.g., a credit card or a debit card), or a computer device (e.g., a smartphone or tablet computer) configured to communicate such information or data regarding a payment instrument via wireless means (e.g., a short-range transmission such as NFC). Alternatively, the swipe reading system 352 may be a bar code reader or like system configured to read and/or interpret an optically readable identifier marked on a physical article such as a card, or displayed on a computer device such as a smartphone, a tablet computer or a wristwatch. The cover 354 is a security measure that conceals and/or protects all or a portion of the swipe reading system 352 against efforts at tampering and/or theft, such as the installation of one or more skimmers or skimming devices that attempt to surreptitiously extract data from cards or other instruments. The audio port 356 is an audio jack into which a connector to a media device and/or output device such as headphones, earphones, ear buds or the like may be inserted.

The alignment of the display assemblies 330A, 330B shown in FIGS. 3A and 3B enable an associate or a customer who is standing, seated or positioned at the associate station 310A or the customer station 310B to view and interact with the display assemblies 330A, 330B, in most instances without regard to the individual height of the respective customer or associate. For example, where the distal ends of the stand assemblies 320A, 320B are each mounted to a height of approximately forty-eight inches (48") above a working surface and the display assemblies 330A, 330B each include interactive displays having a thirteen inch (13") diagonal diameter and a 4:3 viewing ratio, the vertical spans of the interactive displays will extend between approximately forty-four inches (44") and fifty-two (52") inches. It is understood that typical seated eye heights (e.g., fifth to ninety-fifth percentiles) range between approximately twenty-six and approximately thirty-three inches (26" to 33") for females and between approximately twenty-eight inches and approximately thirty-five inches (28" to 35") for males. Therefore, because an average height of a wheelchair seat is approximately nineteen inches (19"), the display assemblies 330A, 330B may be viewed and interacted with by nearly every person, male or female, who is positioned at the associate station 310A or the customer station 310B in a wheelchair, with no more than a moderate upward gaze and, in many instances, a moderate downward gaze. Moreover, it is also understood that typical standing eye heights (e.g., fifth to ninety-fifth percentiles) range between approximately fifty-six and approximately sixty-four inches (56" to 64") for females and between approximately sixty and approximately sixty-nine inches (60" to 69") for males. Therefore, the display assemblies 330A, 330B may be viewed and interacted with by nearly every person, male or female, who is positioned at the associate station 310A or the customer station 310B in a normal standing posture, with a moderate downward gaze.

Although the associate station 310A is shown as not including an instrument reader, unlike the customer station 310B, those of ordinary skill in the pertinent arts will recognize that the associate station 310A may be outfitted with one or more instrument readers, similar in size, shape, form or function to the instrument reader 350 of the customer station 310B, with minimal modification.

Figure 4A:
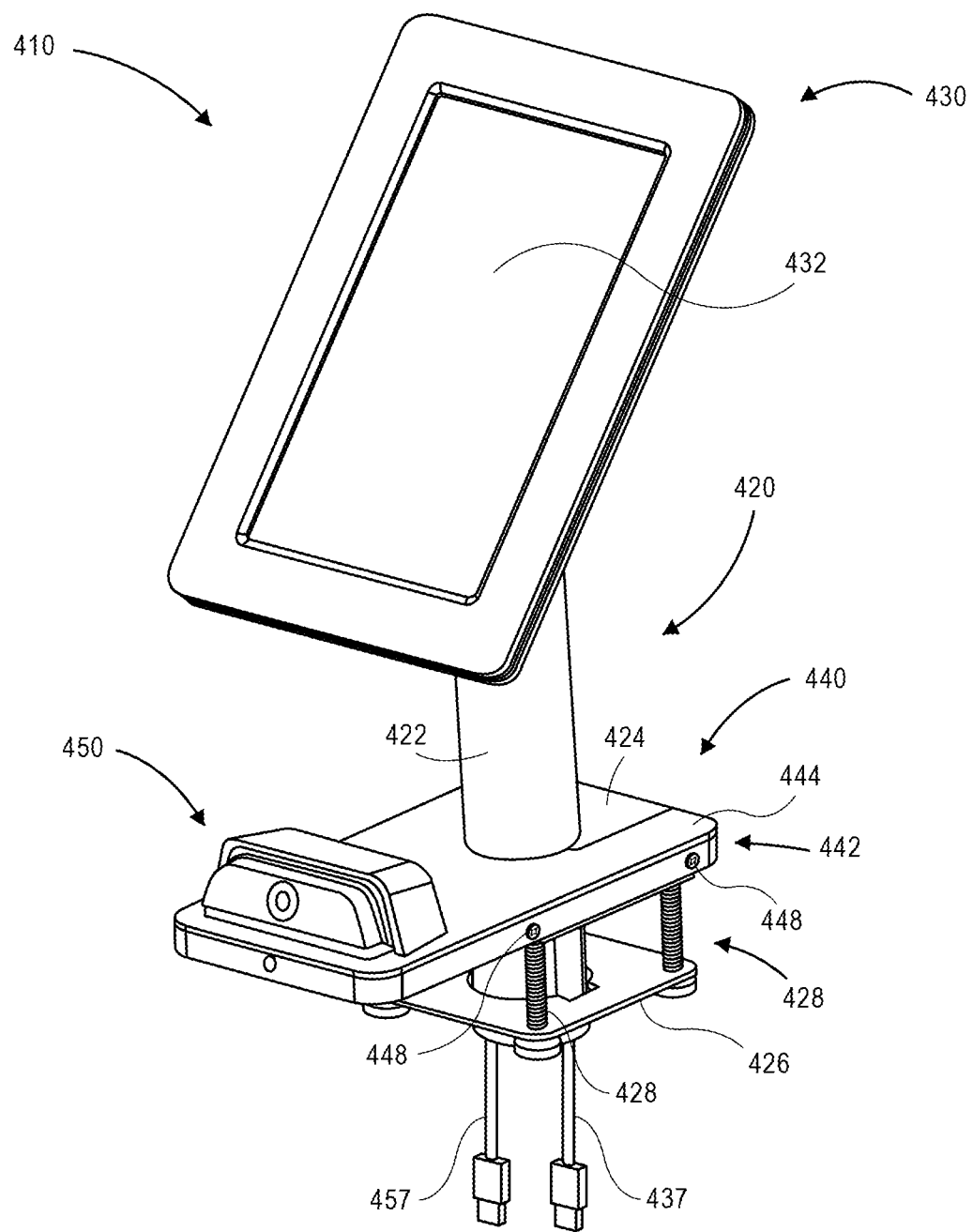
FIGS. 4A and 4B are views of aspects of one point-of-sale system in accordance with implementations of the present disclosure.
Figure 4B:
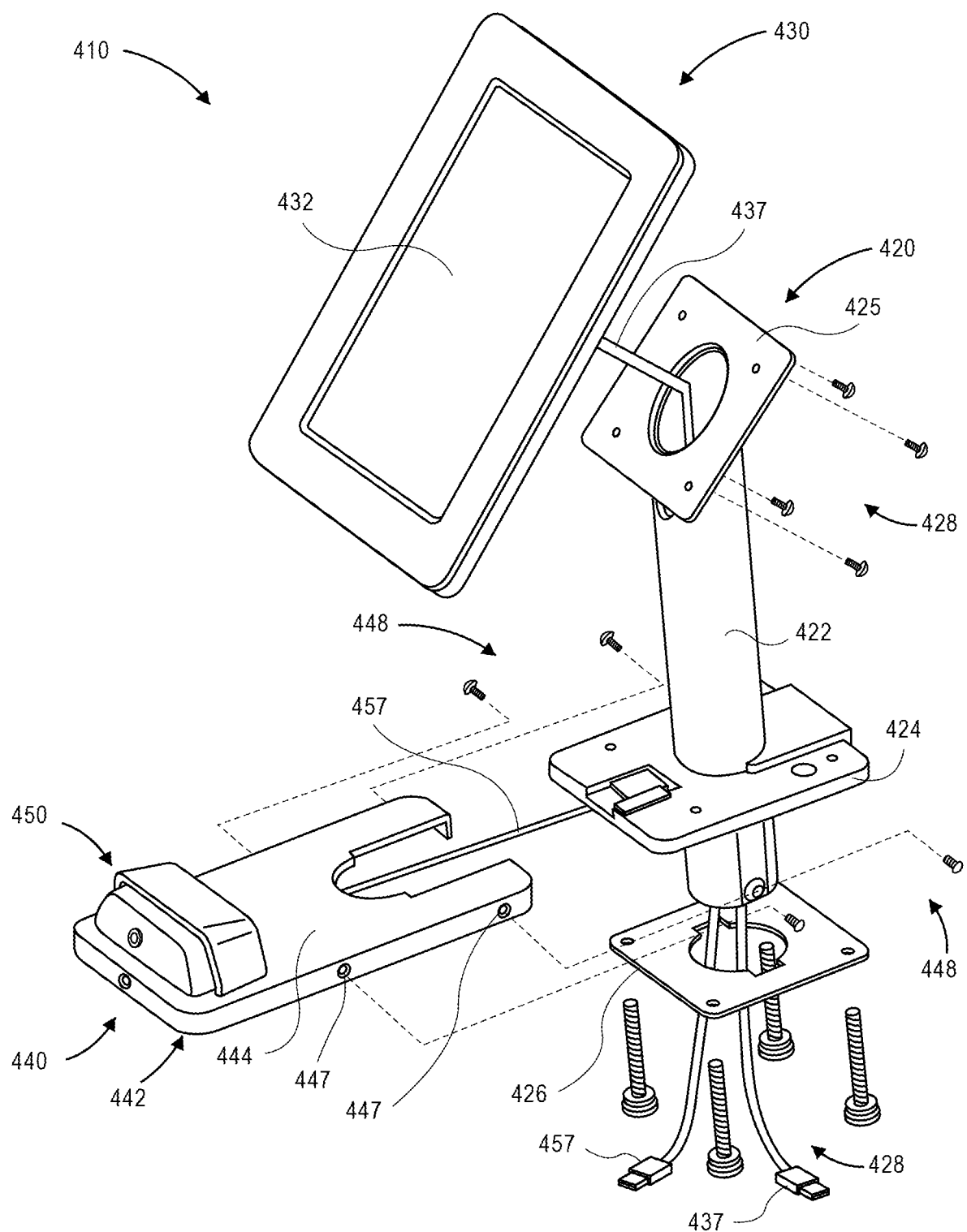
Figure 5C:
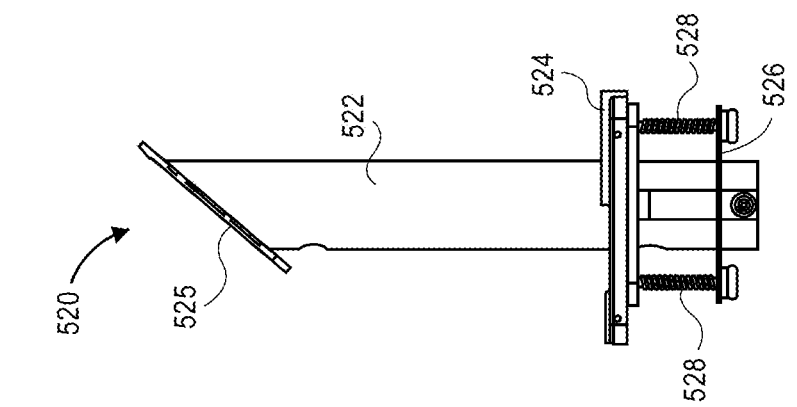
Figure 5B:
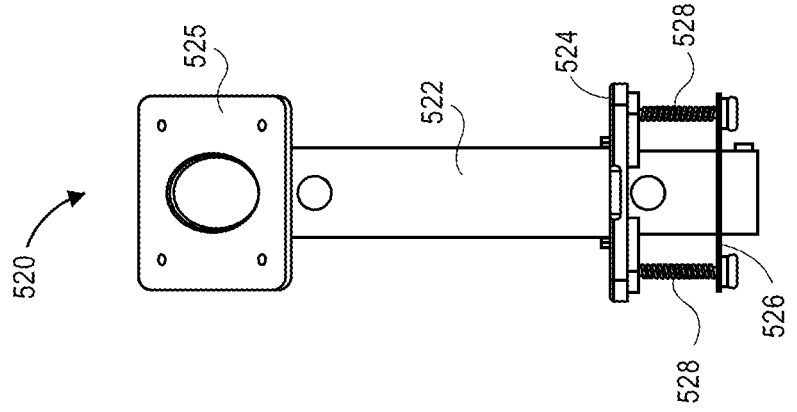
Figure 5A:
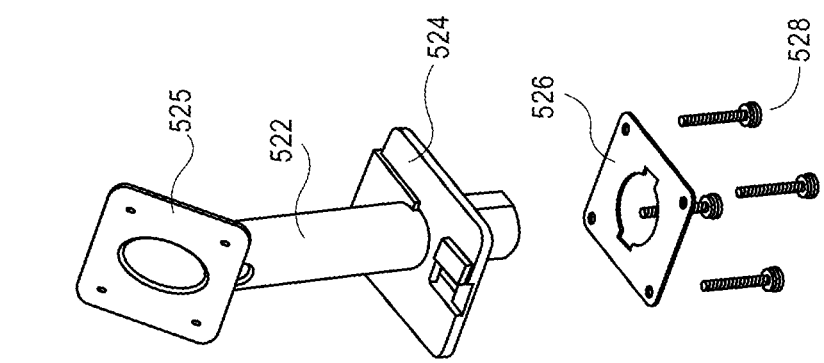

Referring to FIGS. 4A and 4B, views of aspects of one station 410 at a point-of-sale system in accordance with implementations of the present disclosure are shown. Except where otherwise noted, reference numerals preceded by the number "4" in FIG. 4A or 4B refer to elements that are similar to elements having reference numerals preceded by the number "3" in FIG. 3A, 3B or 3C, by the number "2" in FIG. 2 or by the number "1" shown in FIGS. 1A and 1B.

FIG. 4A is a perspective view of the station 410 in an assembled state. FIG. 4B is an exploded view of the station 410 in a disassembled state. As is shown in FIGS. 4A and 4B, the station 410 includes a stand assembly 420, a display assembly 430, a base assembly 440 and an instrument reader 450. The stand assembly 420 includes a column 422, an upper clamp plate 424 near a proximal end of the column 422 and an angled mounting plate 425 at a distal end of the column 422. The display assembly 430 includes an interactive display 432 (e.g., a capacitive and/or resistive touchscreen) mounted therein. The base assembly 440 includes a base chassis 442 and a substantially horizontal cover plate 444 mounted thereto. The instrument reader 450 is mounted to an upper panel of the cover plate 444.

Additionally, a cable 437 is connected at one end to a rear face of the interactive display 432. The cable 437 extends through the angled mounting plate 425 at the distal end of the column 422 and into the column 422 before emerging below the proximal end of the column 422, where another end of the cable 437 may be connected to a computer device, e.g., a single-board computer. Similarly, a cable 457 is connected at one end to the instrument reader 450 (e.g., to a reading system and/or audio port provided thereon). The cable 457 extends substantially horizontally through the base chassis 442 and beneath the cover plate 444 and into an opening in the upper clamp plate 424 before entering the column 422 and emerging below the proximal end of the column 422, where another end of the cable 457 may be connected to a computer device, along with the cable 437. The stand assembly 420, the display assembly 430 and/or the base assembly 440 may include any number or type of routing features such as plates, guides, clamps or grips for guiding the cables 437, 457, for reducing tension in the cables 437, 457, or for protecting the cables 437, 457 against shear or other damage.

In some implementations, the modular design of the station 410 enables one or more components of the station 410 to be installed and/or replaced at a cash wrap in a simple and effective manner. First, the stand assembly 420 is mounted to a flat panel (e.g., a substantially horizontal surface) of a cash wrap, a counter, a table or another fixture by inserting the proximal end of the column 422 into an appropriately sized hole or other opening in the flat panel, and by bolting a lower clamp plate 426 to the upper clamp plate 424 by a plurality of bolts 428 or other fasteners, which may be extended through sufficiently sized holes in the lower clamp plate 426 and the flat panel, and screwed or bolted into corresponding threaded holes (not shown) in an underside of the upper clamp plate 424. In some implementations, the hole or opening in the panel of the cash wrap, the counter, the table or the other fixture may have a cross-section that corresponds to and is sufficiently larger than a cross-section of the column 422, but is no smaller than an area of either the upper clamp plate 424 or the lower clamp plate 426. Where the bolts 428 are tightened to a sufficient loading in tension, the stand assembly 420 is clamped in place at the cash wrap, the counter, the table or the other fixture.

Next, the display assembly 430 is mounted to the angled mounting plate at the distal end of the column 422, e.g., by extending one or more screws 428 or other threaded fasteners through sufficiently sized holes in the angled mounting plate 425 and screwing the screws 428 into corresponding threaded holes (not shown) in a rear side of the display assembly 430, opposite the interactive display 432. Any cables or other connectors for providing power and/or data to the interactive display 432, or for receiving data regarding interactions with the interactive display 432, such as the cable 437, may be extended through the hole in the angled mounting plate 425, into the column 422, and below the panel of the cash wrap, the counter, the table or the other fixture to which the stand assembly 430 is mounted, where the cables may be connected to a computer device configured to execute transactions at the station 410, such as the computer device 112 of FIG. 1B. Finally, the base assembly 440 is mounted to the upper clamp plate 424 or another component of the stand assembly 420, e.g., by screws 448 or other threaded fasteners extended through holes 447 and into lateral sides or other aspects of the upper clamp plate 424. The instrument reader 450 may be joined to the base assembly 440 prior to or after mounting the base assembly 440 to the upper clamp plate 424, and any cables or other connectors for providing power and/or data to the instrument reader 450, or for receiving data regarding interactions with the instrument reader 450, such as the cable 457, may be extended through openings or spaces within or between the base chassis 442 and the cover plate 444, into the column 422 by way of the upper clamp plate 424, and below the panel of the cash wrap, the counter, the table or the other fixture to which the stand assembly 430 is mounted, where the cables may be connected to a computer device configured to execute transactions at the station 410, such as the computer device 112 of FIG. 1B along with the cable 437.

The screws 428, 448 or the bolts 428 may be any suitable fasteners having a sufficient strength rating to support the mounting of the display assembly 430 to the stand assembly 420, the base assembly 440 to the stand assembly 420, or the stand assembly to a cash wrap, a counter, a table or another fixture, respectively. In some implementations, the screws 428, 448 and/or the bolts 428 may have secure heads and/or tamper-resistant heads that inhibit tampering with the station 410 or the various components thereof.

Referring to FIGS. 5A through 5D, views of aspects of one point-of-sale system in accordance with implementations of the present disclosure are shown. Except where otherwise noted, reference numerals preceded by the number "5" in FIG. 5A, 5B, 5C or 5D refer to elements that are similar to elements having reference numerals preceded by the number "4" in FIG. 4A or 4B, by the number "3" in FIG. 3A, 3B or 3C, by the number "2" in FIG. 2 or by the number "1" shown in FIGS. 1A and 1B.

A stand assembly 520 is shown in FIGS. 5A through 5D. The stand assembly 520 includes a column 522, an upper clamp plate 524, an angled mounting plate 525, a lower clamp plate 526 and a plurality of bolts 528 or other fasteners. As is discussed above, the column 522 defines an axis and is substantially hollow, with a circular cross section. The upper clamp plate 524 is mounted near a proximal end of the column 522 substantially perpendicular to the axis defined by the column 522, e.g., between the proximal end of the column 522 and a distal end of the column 522, where the angled mounting plate 525 is mounted at a non-perpendicular angle with respect to the axis defined by the column 522. The angled mounting plate 525 may have a plurality of holes or other openings for accommodating fasteners to join a display assembly and/or one or more interactive displays thereto, and the holes or other openings may have any diameter or number, or be arranged in any pattern. As is also discussed above, the stand assembly 520 may be mounted to a substantially flat panel of a cash wrap 560 having a hole or other opening having an area and/or shape corresponding to a cross-section of the column 522, by inserting the proximal end of the column 522 into the hole or other opening, thereby causing the upper clamp plate 524 to contact the upper panel of the cash wrap 560, and by bolting the lower clamp plate 526 to the upper clamp plate 524 by way of the bolts 528, thereby causing the lower clamp plate 526 to contact a lower panel of the cash wrap 560, and thereby clamping at least a portion of the cash wrap 560 therebetween. In some implementations, the cash wrap 560 may include one or more holes distributed around the opening into which the proximal end of the column 522 is inserted, with each of such holes extending therethrough for accommodating each of the bolts 528 joining the upper clamp plate 524 and the lower clamp plate 526.

The components of the stand assembly 520 may be formed from any sufficiently strong, durable and appropriately sized materials, such as wood, plastics (e.g., reinforced plastics such as fiberglass), metals (e.g., forged steel or aluminum) or composites. In some implementations, the column 522 may be a standard-stock aluminum tube that may be formed from an alloy of aluminum (e.g., an aluminum A6061 alloy) and machined and finished, as necessary, to meet one or more specifications. The angled mounting plate 525 comprises a Video Electronic Standards Association (or "VESA")-compliant mount that is welded (e.g., spot-welded) to an angled upper edge of the column 522, e.g., by welds applied along the inner edge of the column 522, to conceal the welds from view. In some implementations, the upper clamp plate 524 and/or the bottom clamp plate 526 are formed from steel or a steel alloy, having a thickness of approximately two-and-one-half millimeters (2.5 mm), and may be anodized and/or polished, as necessary. The dimensions of the various aspects of the stand assembly 520 may be selected on any basis.

Figure 6:
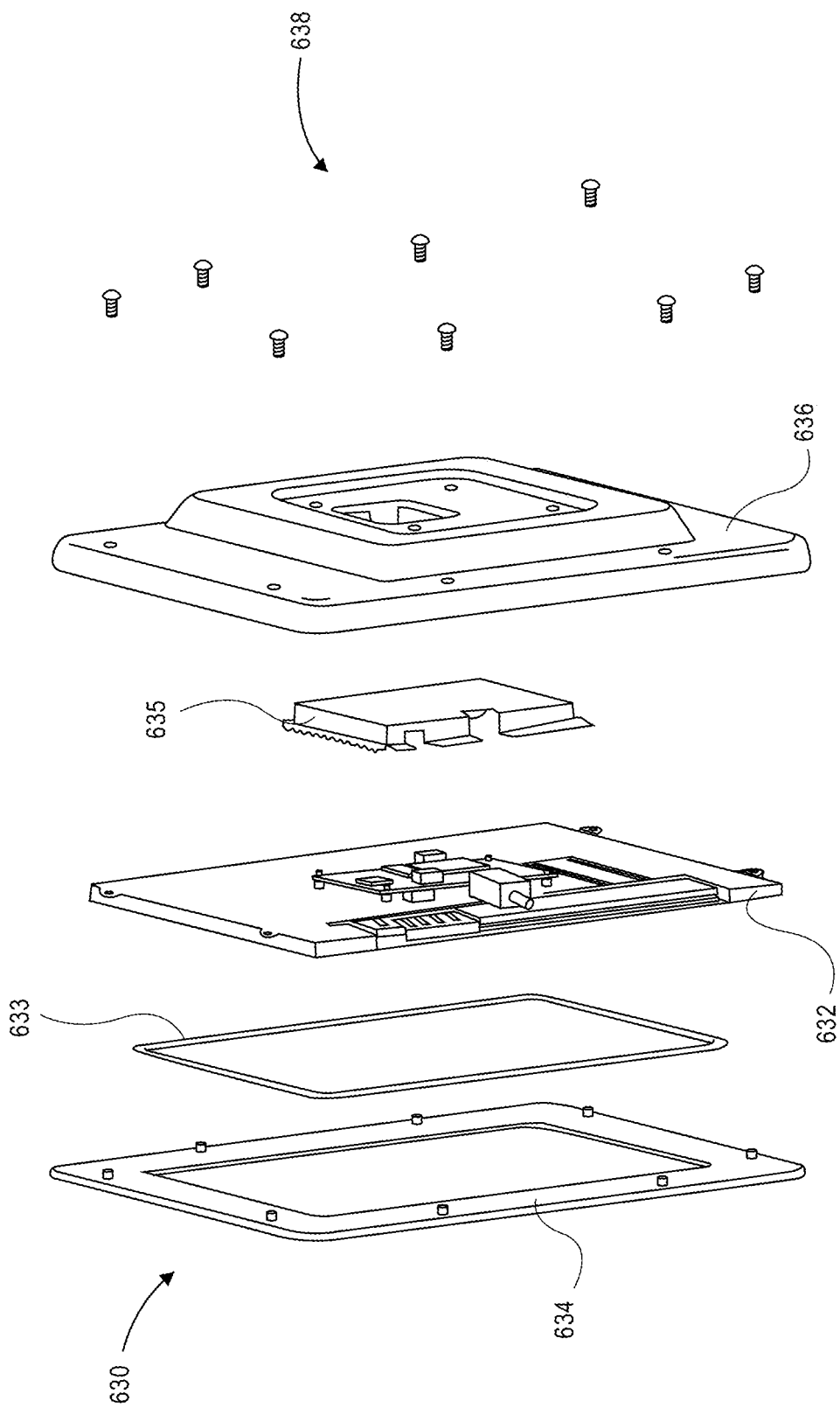
FIG. 6 is a view of aspects of one point-of-sale system in accordance with implementations of the present disclosure.

Referring to FIG. 6, a view of aspects of one point-of-sale system in accordance with implementations of the present disclosure is shown. Except where otherwise noted, reference numerals preceded by the number "6" in FIG. 6 refer to elements that are similar to elements having reference numerals preceded by the number "5" in FIG. 5A, 5B, 5C or 5D, by the number "4" in FIG. 4A or 4B, by the number "3" in FIG. 3A, 3B or 3C, by the number "2" in FIG. 2 or by the number "1" shown in FIGS. 1A and 1B.

A display assembly 630 is shown in FIG. 6. The display assembly 630 includes an interactive display 632, a gasket 633, a bezel 634, an electromagnetic interference shield 635, a rear housing 636 and a plurality of fasteners 638. The bezel 634 and the housing 636 may be formed from any sufficiently strong, durable and appropriately sized materials, such as wood, plastics (e.g., reinforced plastics such as fiberglass), metals (e.g., forged steel or aluminum) or composites. In some implementations, the bezel 634 may be formed from a stock three millimeter (3 mm) thick sheet of aluminum (e.g., an aluminum A6061 alloy) and/or may include one or more anodized surfaces. In some implementations, the bezel 634 defines an opening through which a viewing surface of the interactive display 632 is accessible.

The electromagnetic interference shield 635 may be formed from any sufficient material for reducing electromagnetic fields, e.g., sheet metals, metal screens or metal foams, which may, in some implementations, be coated with a suitable metal material such as copper or nickel. In some implementations, the electromagnetic interference shield 635 will be a sheet or container of galvanized steel or thin passivated aluminum folded to correspond to components of the interactive display 632. The housing 636 is provided for joining the display assembly 630 to a stand assembly (not shown), e.g., to the angled mounting plate 525 of the stand assembly 520 shown in FIGS. 5A through 5D. The housing 636 may include pockets or other interior chambers for accommodating various components of the display assembly 630, including but not limited to the electromagnetic interference shield 635. The housing 636 may also include a plurality of mounting holes, each aligned in a pattern consistent with pattern provided on an angled mounting plate of a stand assembly, such as the angled mounting plate 525 of the stand assembly 520 shown in FIGS. 5A through 5D. For example, the housing 636 may include a mounting interface provided in a standard seventy-five millimeter (75 mm) VESA pattern. In some implementations, the housing 636 may be machined or cast as a urethane part.

As is shown in FIG. 6, the display assembly 630 may be formed by aligning the bezel 634, the interactive display 632, the electromagnetic shield 635 and the housing 636 in series with one another, with the gasket 633 provided between the bezel 634 and the interactive display 632, and joining the components of the display assembly 630 together by way of a plurality of screws 638 or other threaded fasteners. The interactive display 632 may be any screen that is configured to display information or data and to receive interactions therewith, e.g., the execution of one or more taps, touches or gestures with respect to a displayed network page or content thereon, such as by touching a portion of the interactive display 632, forming a polygon, a circle, or any other shape thereon, or by defining one or more alphanumeric characters or other symbols. In response to one or more of such interactions, input data correlating the locations of such interactions on the interactive display 632 with content displayed thereon at a time of the contact may be generated accordingly. The interactive display 632 may have any size, resolution or other viewing attributes. For example, in some implementations, the interactive display 632 may have a display size of ten to thirteen inches (10" to 13"), and a display resolution of approximately 1280×800. In some implementations, the interactive display 632 may be an open-frame capacitive touch monitor having a single cable (e.g., a USB cable), which may be extended through one or more routing features such as plates, guides, clamps or grips, and into a stand assembly prior to connecting the cable to a computer device (e.g., a single-board computer), such as the computer 112 of FIG. 1B.

Figure 7A:
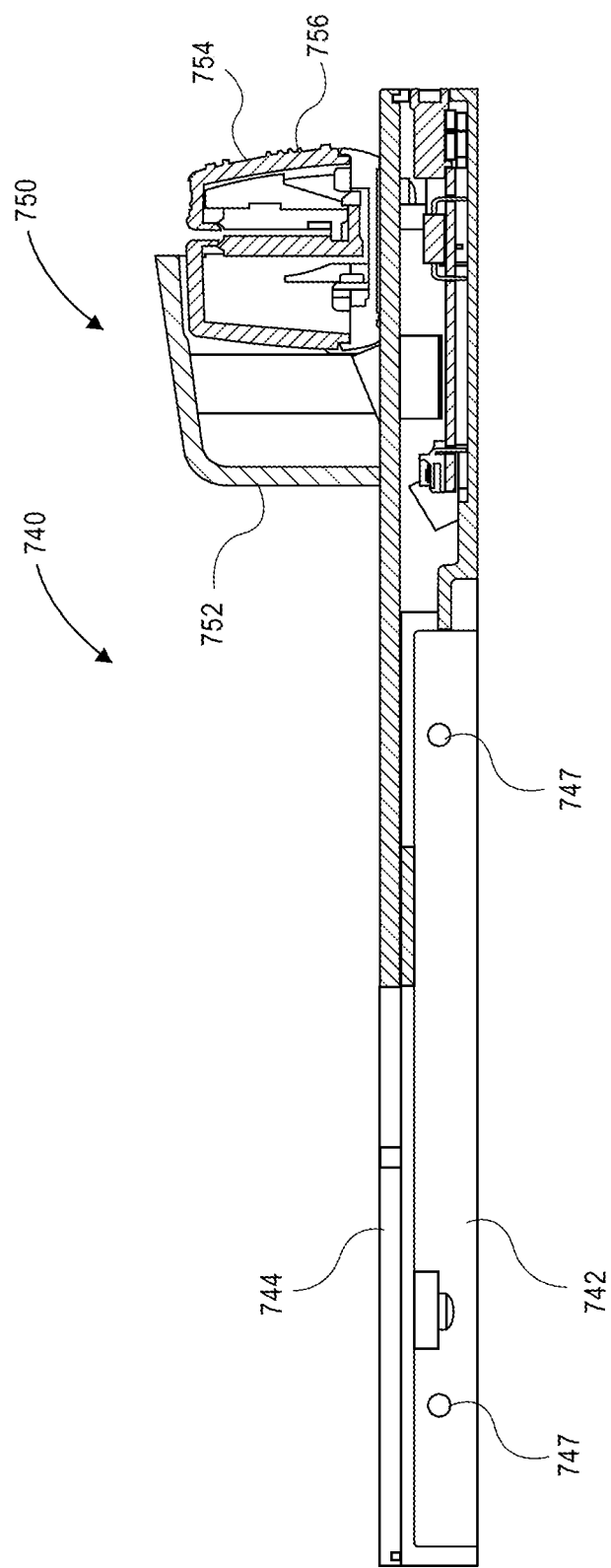
FIGS. 7A and 7B are views of aspects of one point-of-sale system in accordance with implementations of the present disclosure.
Figure 7B:
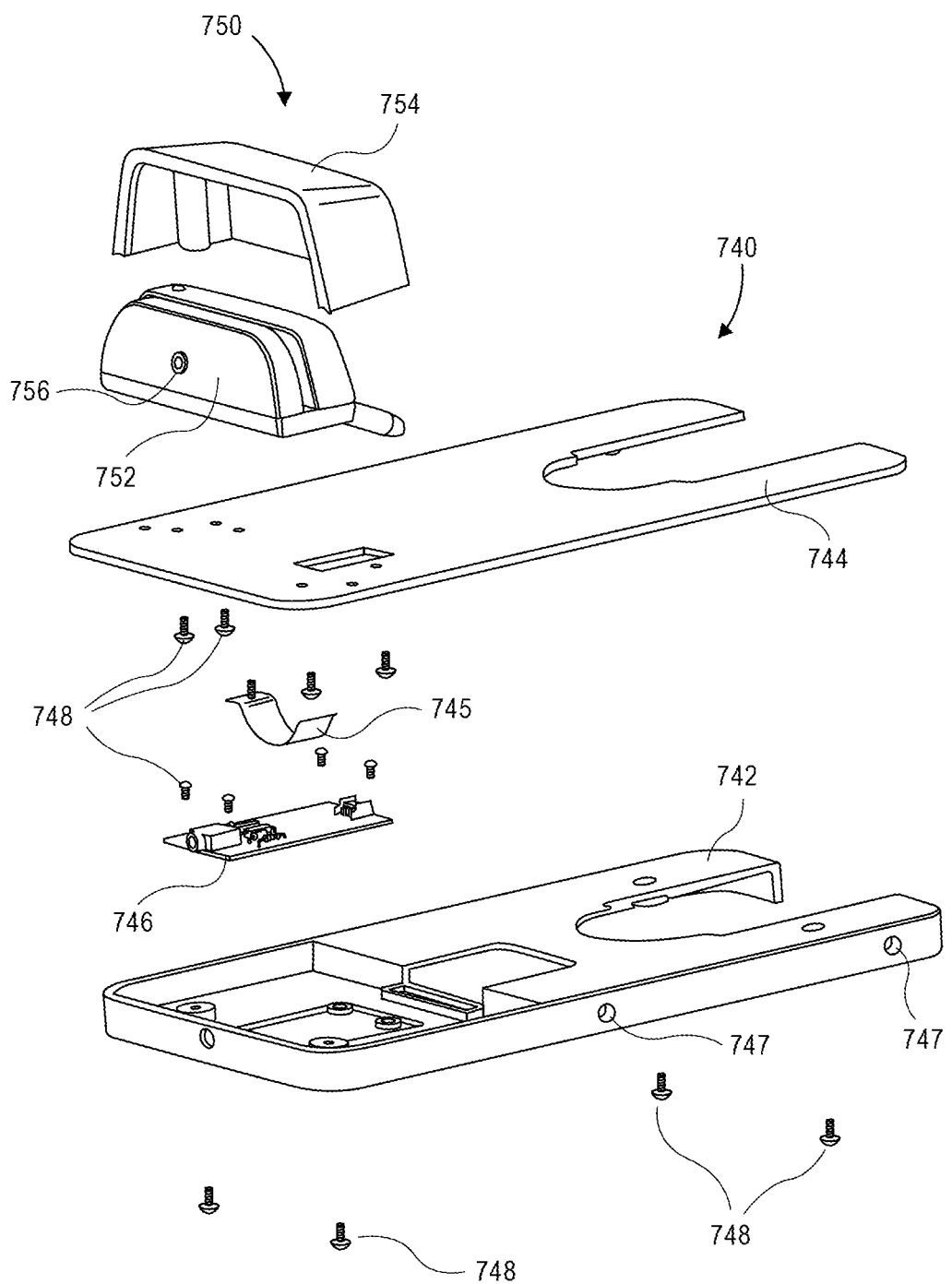

Referring to FIGS. 7A and 7B, views of aspects of one point-of-sale system in accordance with implementations of the present disclosure are shown. Except where otherwise noted, reference numerals preceded by the number "7" in FIG. 7A or FIG. 7B refer to elements that are similar to elements having reference numerals preceded by the number "6" in FIG. 6, by the number "5" in FIG. 5A, 5B, 5C or 5D, by the number "4" in FIG. 4A or 4B, by the number "3" in FIG. 3A, 3B or 3C, by the number "2" in FIG. 2 or by the number "1" shown in FIGS. 1A and 1B.

FIG. 7A is a side view of a base assembly 740 having an instrument reader 750 mounted thereon. FIG. 7B is an exploded view of the base assembly 740 and the instrument reader 750 in a disassembled state. The base assembly 740 includes a base chassis 742, a base plate 744, a spring finger 745 and an audio board 746. The instrument reader 750 includes a reading system 752 covered by a cover 754 and an audio port 756 that is coupled to the audio board 746.

In some implementations, the base plate 744 is formed from stock three millimeter (3 mm) thick sheet formed from an alloy of aluminum (e.g., an aluminum A6061 alloy). The reading system 752 and the cover 754 may be installed on the base plate 744 by way of a plurality of fasteners 748 extending upward from beneath the base plate 744. For example, one or more of the fasteners 748 may be an M3 screw having a nominal diameter of approximately three millimeters (3 mm), a coarse thread pitch of approximately one-half millimeter (0.5 mm), and any sufficiently length. Prior to securing the cover 754 on the reading system 752, or prior to installing the audio board 746 onto the base chassis 742, any cables or connectors may be connected to the reading system 752 and/or the audio board 746 and routed, as necessary. The audio board 746 may be installed within a cavity defined by the base chassis 742 by way of a plurality of fasteners 748, along with an electromagnetic interference spring finger 745 or other component for providing sufficient shielding between the reading system 752 and the audio board 746. In some implementations, the audio board 746 may be any component for providing an audio port or connection (not shown) to an associate or a customer attending a station, subsystem or unit including the base assembly 740 of FIGS. 7A and 7B, e.g., in order to provide audio information to the vision impaired. In some implementations, the spring finger 745 may be formed from any suitable material for providing sufficient shielding, deflection range, spring properties and/or fatigue resistance, including but not limited to beryllium, copper, cobalt, nickel and/or steel.

After the base assembly 740 has been assembled, it may be placed around a column of a stand assembly, e.g., the stand assembly 520 of FIGS. 5A through 5D, and mounted thereon by way of a plurality of fasteners 748 extending through openings 747 in perimeter surfaces of the base chassis 742 and into threaded openings (not shown) within outer perimeter surfaces of an upper clamp plate or other aspect of the stand assembly. Any cables extending from the reading system 752 or the audio board 746 may be extended through an opening of a column of a stand assembly, such as is shown in FIGS. 4A and 4B, and connected to a computer device beneath a panel or other aspect of a cash wrap or other fixture to which the stand assembly is mounted, such as the computer device 112 of FIG. 1B.

In some implementations, the base assembly 740 of FIGS. 7A and 7B is configured for use in a customer station, subsystem or unit of a point-of-sale system, in that the base assembly 740 includes the instrument reader 750 mounted thereto. In some implementations, a base assembly similar to the base assembly 740 that lacks the instrument reader 750 may be configured for use in an associate station, subsystem or unit of a point-of-sale system. Alternatively, a base assembly for use in an associate station, subsystem or unit may include one or more instrument readers, such as the instrument reader 750 of FIGS. 7A and 7B. Additionally, in some implementations, a base assembly may include other types or forms of instrument readers, including but not limited to an RFID reader, a NFC reader, an imaging device, or any other type or form of reading device, and need not include an instrument reader that relies on a swipe or insertion of all or portions of a card, e.g., a credit card or debit card.

Figure 8A:
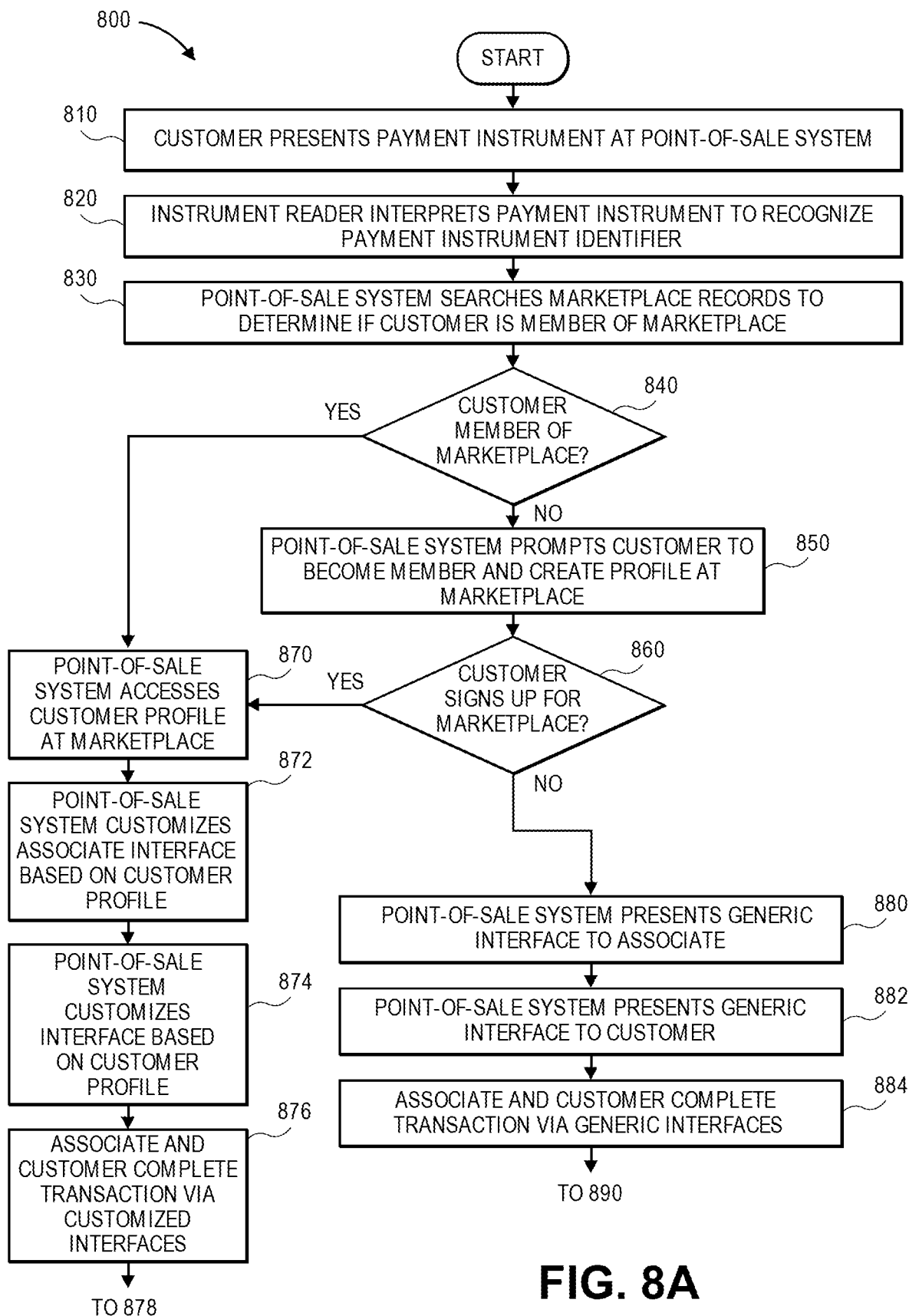
FIGS. 8A and 8B are a flow chart of one process that may be performed using one point-of-sale system in accordance with implementations of the present disclosure.
Figure 8B:
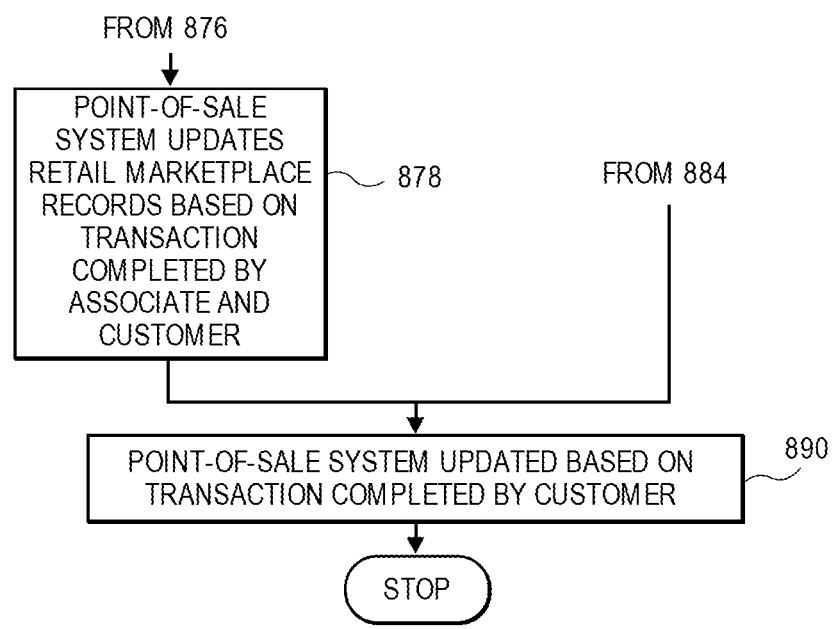

Referring to FIG. 8, a flow chart of one process that may be performed using one point-of-sale system in accordance with implementations of the present disclosure is shown. At box 810, a customer presents a payment instrument at a point-of-sale system. In some implementations, the customer may provide a credit card, a charge card, a debit card or any other type or form of physical representation of an account number. In some implementations, the customer may provide a personal check having a routing number and/or account number thereon. In some implementations, the customer may provide a mobile device such as a smartphone, a tablet computer or a wrist watch that is configured to transmit an identifier of a device or an account via NFC or any other short-range wireless channel, or to display an identifier (e.g., a bar code) of a payment instrument or the mobile device on a screen.

At box 820, an instrument reader interprets the payment instrument to recognize an identifier of the payment instrument, e.g., an account number magnetically encoded onto a strip of a credit card, a debit card or the like, or printed onto a check, an account number or a device number transmitted by a mobile device, or an account number or a device number associated with an identifier displayed on a screen of a mobile device. The instrument reader may be positioned at an entrance to a retail establishment (e.g., at or near a foyer or vestibule), at an exit from the retail establishment (e.g., at a cash wrap), or in any other suitable or appropriate location. For example, the instrument reader may be portable in nature, and carried or transported by one or more associates or on one or more kiosks, carts or other components within the retail establishment. At box 830, a point-of-sale system searches one or more records maintained by a marketplace to determine if the customer is a member of the marketplace, e.g., based on the payment instrument. For example, the point-of-sale system may be granted access to all or a limited portion of customer data at the marketplace for the express purpose of searching for an account number, a device number or any other information associated with the payment instrument. Alternatively, the point-of-sale system may request permission and/or for an authentication to search records of the marketplace based on the account number, the device number or the other identifier, such as by providing a prompt for permission or authentication on an interactive display, by transmitting an electronic message (e.g., an SMS message, an MMS message, a social network message or an electronic mail) including a prompt for permission or authentication to the customer, or in any number of other manners (e.g., two-factor authentication). The marketplace may maintain one or more data stores including tables or records having a variety of fields corresponding to information regarding customers who are members of the marketplace, e.g., in a structured or unstructured format, and any of the fields may be searched or evaluated to determine whether the identifier of the payment instrument obtained at box 820 is stored thereon. In accordance with implementations of the present disclosure, "membership" may be defined in any context, including but not limited to whether the customer has previously purchased one or more items from the marketplace at any time, or within a predetermined period of time, whether the customer has paid a regular fee, or whether the customer has satisfied any other requirement.

At box 840, if the customer is determined to be a member of the marketplace, then the process advances to box 870, where the point-of-sale system accesses a profile of the customer at the marketplace. At box 872, the point-of-sale system customizes an associate interface at the point-of-sale system based on the customer profile. For example, referring again to FIGS. 1A and 1B, the point-of-sale system may display information or data in the form of one or more pages of information or data regarding the customer, or that may be associated with the customer, the marketplace, or the retail establishment at which the point-of-sale system is provided onto the display assembly 130A. For example, the user interface may include a list of items previously purchased by the customer, either at the retail establishment or from the marketplace, as well as dates or times of such prior purchases. The user interface may also indicate whether the customer may be receptive to one or more offers or promotions, including sales of items that are known or believed to be of interest to the customer. The user interface may also indicate whether the customer prefers any particular services, such as assistance with delivering purchased items to a vehicle, or to a location designated by the customer. Any information regarding the customer that may be maintained in a customer profile or other record may be identified and used to customize the user interface for any purpose, such as to aid an associate in providing service to the customer, or to otherwise enhance the customer's experience at the retail establishment accordingly.

At box 874, the point-of-sale system customizes a customer interface at the point-of-sale system based on the customer profile. For example, referring again to FIGS. 1A and 1B, the point-of-sale system may display information or data in the form of one or more pages that may be familiar to the customer, or may be associated with the customer, the marketplace, or the retail establishment at which the point-of-sale system is provided onto the display assembly 130B. For example, the user interface may display a home page, or a "splash page," of a network site maintained by the marketplace, and may include any number of promotions that may be targeted to the customer directly, or promotions that are relevant based on the location of the point-of-sale system, a time or day at which the customer accessed the point-of-sale system, or the like. The user interface may also display information regarding items that were previously purchased by the customer, items that are believed to be owned by the customer, or items in which the customer is known or believed to be interested. Any information regarding the customer that may be maintained in a customer profile or other record may be identified and used to customize the user interface for any purpose, such as to facilitate the execution of one or more transactions, or to otherwise enhance the customer's experience at the retail establishment accordingly.

At box 876, the associate and the customer complete a transaction via the customized interfaces of the point-of-sale system, e.g., a transaction for the purchase, rent, lease or borrowing of one or more items from the retail establishment. Via the customer interfaces, the parties may present and/or accept offers for the one or more items, and may exchange consideration. For example, the associate may identify and record information regarding items that the customer intends to purchase, e.g., by manual or automatic means, such as by executing one or more taps, touches or gestures with the customized interface and/or one or more external input/output devices (e.g., a scanner mounted to the cash wrap or configured for handheld operation). Likewise, the customer may execute one or more taps, touches or gestures with the customized interface to confirm his or her intent to enter into the transaction and to authorize a deduction of a charge associated with at least the one or more items from an account associated with the payment instrument presented at the point-of-sale system at box 810, or in any other manner. At box 878, the point-of-sale system updates records at the marketplace based on the transaction completed by the associate and the customer, for example, to identify the items that the customer has purchased, rented, leased or borrowed, the costs or amounts associated with the transaction, and any relevant warranties or return policies covering the specific transaction, or to update inventory records regarding available items (e.g., to decrease a number of the one or more items that were the subject of the transaction).

If the customer is determined to not be a member of the marketplace at box 840, then the process advances to box 850, where the point-of-sale system prompts the customer to become a member and to establish a customer profile at the marketplace. For example, the point-of-sale system may display one or more promotions or other interactive features by which the customer may enter his or her personal information (e.g., name, telephone numbers, electronic mail or social network addresses or identifiers, street addresses or the like), and to identify one or more personal preferences of himself or herself, or of his or her family members (e.g., preferred brands, products or styles). At box 860, whether the customer has signed up for the marketplace is determined. If the customer has signed up for the marketplace, e.g., by becoming a member and creating a customer profile, then the process advances to box 870, where the point-of-sale system accesses the customer profile of the customer, as is described above. If the customer has not signed up for the marketplace, however, then the process advances to box 880, where the point-of-sale system presents a generic interface to the associate, and to box 882, where the point-of-sale system presents a generic interface to the customer. The generic interfaces may include one or more promotions or other information or data that may be associated with a retail establishment where the point-of-sale system is provided, or a location of the retail establishment, or any upcoming or recent events or circumstances of local, regional, national or global significance, or any other information or data. At box 884, the associate and the customer complete a transaction via the generic interfaces, such as by identifying items desired by the customer, or providing an authorization to enter into the transaction, and by making a payment by way of the payment instrument presented at the point-of-sale system at box 810, or in any other manner.

At box 890, the point-of-sale system is updated based on the completed transaction, i.e., to clear any personal information or data therefrom, or to inform the customer that the transaction has been completed, and the process ends.

Figure 9B:
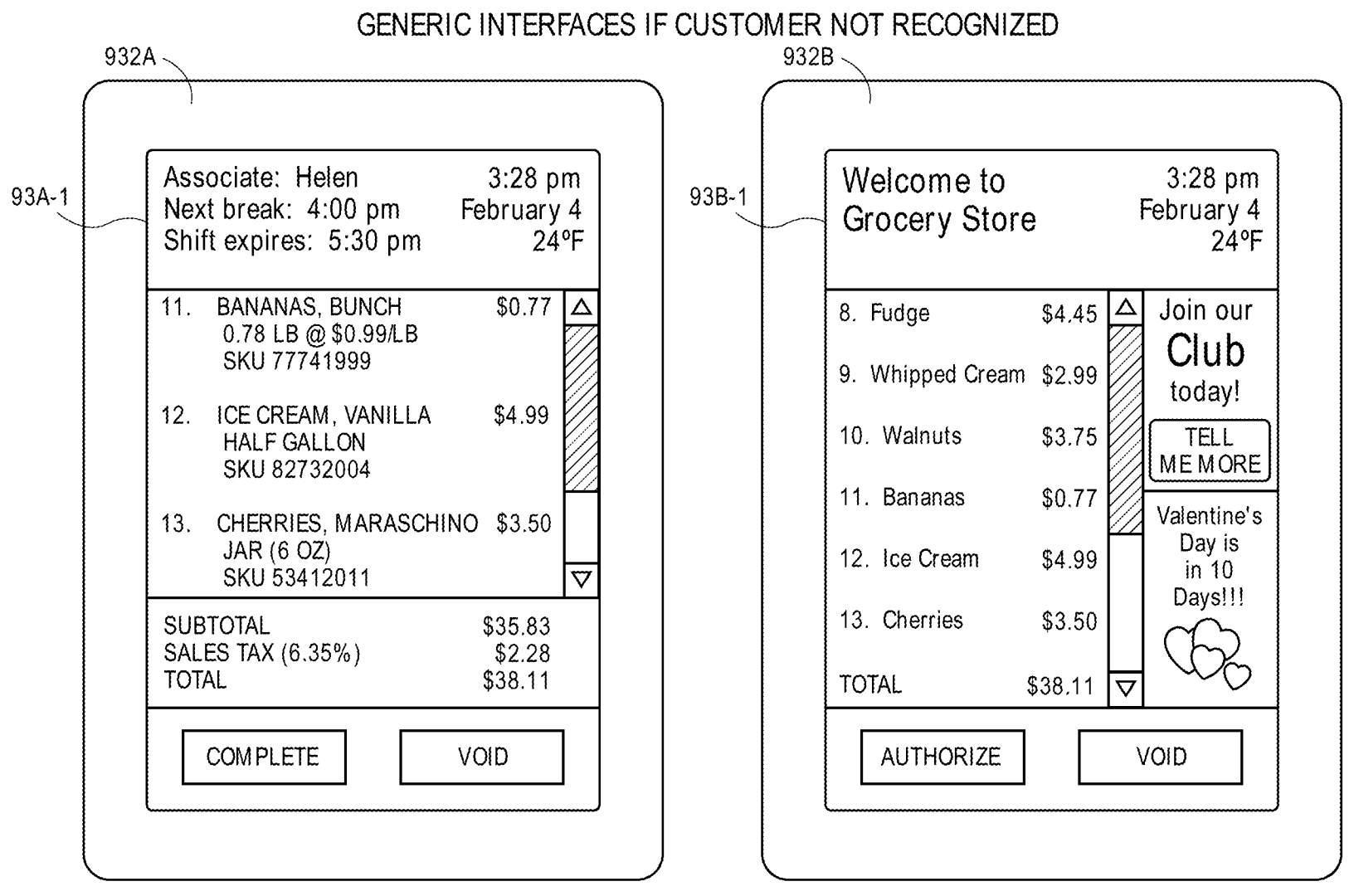

User interfaces that are presented to an associate and a customer, respectively, by a point-of-sale system after the customer has been identified may be customized in any manner, based on information or data that may be known regarding the customer and determined upon his or her identification, including but not limited to information or data maintained in a profile of the customer at an electronic marketplace. Referring to FIGS. 9A through 9C, views of aspects of one point-of-sale system in accordance with implementations of the present disclosure are shown. Except where otherwise noted, reference numerals preceded by the number "9" in FIG. 9A through 9C refer to elements that are similar to elements having reference numerals preceded by the number "7" in FIG. 7A or FIG. 7B, by the number "6" in FIG. 6, by the number "5" in FIG. 5A, 5B, 5C or 5D, by the number "4" in FIG. 4A or 4B, by the number "3" in FIG. 3A, 3B or 3C, by the number "2" in FIG. 2 or by the number "1" shown in FIGS. 1A and 1B.

Referring to FIG. 9A, views of aspects of a system 900 including a point-of-sale system 905 in accordance with implementations of the present disclosure are shown. The point-of-sale system 905 includes an associate station 910A and a customer station 910B, each of which is mounted to a cash wrap 960 having a scanner 965 mounted thereon. The associate station 910A includes a stand assembly 920A, a display assembly 930A and a base assembly 940A. Similarly, the customer station 910B includes a stand assembly 920B, a display assembly 930B, a base assembly 940B and an instrument reader 950.

As is discussed above, and in accordance with the present disclosure, customers may present a payment instrument at a point-of-sale system. As is shown in FIG. 9A, a customer 90 swipes a credit card 95 through a reading system 952 of the instrument reader 950. The reading system 952 may then interpret a magnetic stripe provided on the credit card 95, recognize an identifier of the credit card based on the magnetic stripe, and attempt to identify the customer 90 based on the identifier. Alternatively, the customer 90 may present a payment instrument at the point-of-sale system 905 in any other manner, such as by scanning a card or a mobile device having a bar code printed or displayed thereon using the scanner 965, interpreting the bar code, recognizing an identifier of the payment instrument or the mobile device based on the bar code, and attempt to identify the customer 90 based on the identifier.

Content to be rendered on an interactive display may be selected based on whether a customer is identified as a member of an electronic marketplace, or is not so identified, upon presenting a payment instrument at a point-of-sale system. As is shown in FIG. 9B, interactive displays 932A, 932B of the display assemblies 930A, 930B shown in FIG. 9A are shown after the customer 90 was not recognized as a member of an electronic marketplace following the swiping of the credit card 95 as shown in FIG. 9A. A user interface 93A-1 displayed to an associate on the interactive display 932A is generic, and includes information regarding the associate, as well as the current date, time and outdoor temperature, a list of items to be purchased by the customer 90, a summary of a cost of the items, and interactive features for completing or voiding a transaction for the items. Similarly, a user interface 93B-1 displayed to the customer 90 on the interactive display 932B is also generic, and includes information regarding a retail establishment where the point-of-sale system 905 is provided, as well as the current date, time and outdoor temperature, a list of items to be purchased by the customer 90, a summary of a cost of the items, a number of promotions offered to customers at the retail establishment, and interactive features for authorizing or voiding a transaction for the items.

As is shown in FIG. 9C, the interactive displays 932A, 932B are shown after the customer 90 was recognized as a member of the electronic marketplace following the swiping of the credit card 95 as shown in FIG. 9A. A user interface 93A-2 displayed to the associate on the interactive display 932A includes customized information regarding the customer 90, e.g., information maintained in a customer profile at the electronic marketplace, including a name of the customer 90, a number of personal preferences or other information regarding the customer 90 (e.g., that the customer's birthday is on that date, and that the customer prefers puppy dogs, ice cream and paper bags, but does not prefer plastic bags), as well as a list of items to be purchased by the customer 90, a summary of a cost of the items, and interactive features for completing or voiding a transaction for the items. Similarly, a user interface 93B-2 displayed to the customer 90 on the interactive display 932B is also customized for the customer 90, and includes information regarding the customer 90 (e.g., a greeting to the customer 90, an acknowledgment that the customer 90 is celebrating a birthday on that date), specific promotions tailored to the customer 90 (e.g., a discount based on the information regarding the customer), as well as a list of items to be purchased by the customer 90, an offer of recommended items (e.g., napkins) based on the items that the customer 90 intends to purchase, a summary of a cost of the items, and interactive features for authorizing or voiding a transaction for the items.

As is discussed above, after the associate and the customer 90 complete the transaction via the interactive displays 932A, 932B, the point-of-sale system 905 may update inventory records at the retail establishment and delete the personal information of the customer 90 therefrom. Additionally, if the customer 90 is identified as a member of an electronic marketplace, a profile of the customer at the electronic marketplace may be updated to include information or data regarding the items purchased by the customer 90 accordingly.

Although some implementations of the present disclosure describe the use of one or more implementations in retail environments, those of ordinary skill in the pertinent arts will realize that the systems and methods of the present disclosure are not so limited. Rather, the systems and methods of the present disclosure may be utilized in environments such as libraries, stadiums, theaters or the like, where admission or permission to enter may be granted upon identifying a patron based on information obtained from a payment instrument associated with the patron using a magnetic card reader, a NFC reader, an RFID reader, or any other type or form of reading device.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 8, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
    a fixture having an upper panel and an interior chamber beneath the upper panel;
    a first stand assembly comprising a first column mounted to the fixture, wherein a first end of the first column is inserted into a first opening in the upper panel;
    a first display mounted to a second end of the first column, wherein a first viewing surface of the first display is aligned at a first angle with respect to vertical, and wherein a first normal from the first viewing surface faces a first direction;
    a second stand assembly comprising a second column mounted to the fixture, wherein a first end of the second column is inserted into a second opening in the upper panel;
    a second display mounted to a second end of the second column, wherein a second viewing surface of the second display is aligned at a second angle with respect to vertical, and wherein a second normal from the second viewing surface faces a second direction;
    an instrument reader provided in association with the second stand assembly; and
    a computer device disposed within the interior chamber of the fixture,
        wherein the first display is coupled with the computer device by a first cable extending through the first column and the first opening at least in part,
        wherein the second display is coupled with the computer device by a second cable extending through the second column and the second opening at least in part, and
        wherein the instrument reader is coupled with the computer device by a third cable extending through the second column and the second opening at least in part.

2. The system of claim 1, further comprising a first display assembly,
    wherein the first display assembly comprises:
        a bezel;
        a rear housing; and
        the first display, wherein the first display is disposed between the bezel and the rear housing, and
    wherein the first display assembly is releasably mounted to the second end of the first column by at least one fastener.

3. The system of claim 1, wherein the first stand assembly further comprises a first mounting plate at the second end of the first column, a first upper clamp plate disposed between the first end of the first column and the second end of the first column and a first lower clamp plate joined to the first upper clamp plate by a plurality of fasteners, and
    wherein at least a first portion of the upper panel associated with the first opening is clamped between the first upper clamp plate and the first lower clamp plate.

4. The system of claim 3, wherein the first column and the first mounting plate are formed from an aluminum alloy,
    wherein the first mounting plate is welded to the second end of the first column at the first angle, and
    wherein the first upper clamp plate is formed from a steel alloy and is welded to an outer perimeter of the first column.

5. The system of claim 3, further comprising a first base assembly, wherein the first base assembly comprises:
- a base chassis releasably joined to the first upper clamp plate;
- a base plate releasably joined to the base chassis, wherein the instrument reader is releasably joined to an upper panel of the base chassis; and
- an audio board mounted within a cavity of the base chassis, wherein the base plate is releasably joined over the cavity of the base chassis, and
- wherein the instrument reader further comprises an audio port coupled with the audio board.

6. The system of claim 1, wherein the instrument reader comprises one or more of:
- a magnetic card reader;
- a Near Field Communications reader;
- a radiofrequency identification reader; or
- an optical scanner.

7. The system of claim 1, wherein the second stand assembly further comprises a second mounting plate at the second end of the second column, a second upper clamp plate disposed between the first end of the second column and the second end of the first column, and a second lower clamp plate joined to the second upper clamp plate by a plurality of fasteners, and
- wherein at least a second portion of the upper panel associated with the second opening is clamped between the second upper clamp plate and the second lower clamp plate.

8. The system of claim 1, wherein the first opening has a first cross-section corresponding to a cross-section of the first end of the first column, and
- wherein the second opening has a cross-section corresponding to a cross-section of the first end of the second column.

9. The system of claim 1, wherein at least one of the first cable, the second cable or the third cable is one of:
- a Universal Serial Bus cable;
- a high-definition multimedia interface cable; or
- an Ethernet cable.

10. The system of claim 1, wherein the computer device is programmed with executable instructions for performing a method comprising:
- recognizing a payment instrument by the instrument reader;
- identifying at least one of an account number or a device number associated with the payment instrument;
- determining that the at least one of the account number or the device number is associated with a profile of a customer;
- receiving first data including content of a first page comprising first information regarding the customer over a network;
- rendering the first page on the first display based at least in part on the first data;
- receiving second data including content of a second page comprising second information regarding the customer over the network; and
- rendering the second page on the second display based at least in part on the second data.

11. The system of claim 10, wherein the first page comprises a name of the customer, a charge associated with the at least one item, and at least one of:
- an identifier of the at least one item;
- an identifier of an item previously purchased by the customer;

wherein the second page comprises the name of the customer, the charge associated with the at least one item, and at least one of:
- the identifier of the at least one item;
- a greeting to the customer;
- a promotion targeted to the customer, and
- an interactive feature for authorizing a deduction of the charge from an account associated with the one of the account number or the device number.

12. The system of claim 10, wherein the method further comprises:
- receiving first input data via the first display, wherein the first input data is generated upon contact with at least a first portion of the first viewing surface by an associate;
- identifying at least one item based at least in part on the first input data;
- receiving second input data via the second display, wherein the second input data is generated upon contact with at least a second portion of the second viewing surface by the customer;
- determining that the customer has authorized a charge associated with the at least one item to be deducted from an account associated with one of the account number or the device number based at least in part on the second input data; and
- in response to determining that the customer has authorized the charge,
  - completing a transaction for a purchase of the at least one item by the customer.

13. The system of claim 12, wherein the method further comprises at least one of:
- updating the profile of the customer based at least in part on the transaction for the purchase of the at least one item by the customer; or
- decreasing an inventory record based at least in part on the transaction for the purchase of the at least one item by the customer.

14. A method comprising:
- recognizing a payment instrument by an instrument reader provided in association with a first stand assembly, wherein the first stand assembly comprises a first column mounted to a fixture having an upper panel and an interior chamber beneath the upper panel, and wherein a first end of the first column is inserted into a first opening in the upper panel;
- identifying, by a computer device disposed within the interior chamber of the fixture, at least one of an account number or a device number associated with the payment instrument, wherein the instrument reader is coupled with the computer device by a first cable extending through the first column and the first opening at least in part;
- determining, by the computer device, that the at least one of the account number or the device number is associated with a profile of a customer;
- receiving, by the computer device, first data including content of a first page comprising first information regarding the customer, wherein the first data is received over at least one network;
- rendering, by the computer device, the first page on a first display based at least in part on the first data, wherein the first display is mounted to a second end of the first column, wherein a first viewing surface of the first display is aligned at a first angle with respect to vertical, wherein a first normal from the first viewing surface faces a first direction, and wherein the first display is coupled with the computer device by a first cable extending through the first column and the first opening at least in part;

receiving, by the computer device, second data including content of a second page comprising second information regarding the customer over the network; and rendering, by the computer device, the second page on a second display based at least in part on the second data, wherein the second display is mounted to a first end of a second column mounted to the fixture, wherein a second end of the second column is inserted into a second opening in the upper panel, wherein a second viewing surface of the second display is aligned at a second angle with respect to vertical, and wherein a second normal from the second viewing surface faces a second direction.

* * * * *